US012812306B2

(12) United States Patent
Ellison et al.

(10) Patent No.: US 12,812,306 B2
(45) Date of Patent: Nov. 24, 2026

(54) IN-SITU HEARING ASSESSMENT AND CUSTOMIZED FITTING OF HEARING DEVICES

(71) Applicant: Eargo, Inc., San Jose, CA (US)

(72) Inventors: John Ellison, Minneapolis, MN (US); Hardik Ruparel, Milpitas, CA (US); Jayaganesh Swaminathan, Albany, CA (US); MingYang Lee, Santa Clara, CA (US); Ruchi J Vyas, San Jose, CA (US); Jacob Hall, Saratoga, CA (US); Adriana Goyette, San Jose, CA (US)

(73) Assignee: Eargo, Inc., San Jose, CA (US)

( * ) Notice: Subject to any disclaimer, the term of this patent is extended or adjusted under 35 U.S.C. 154(b) by 220 days.

(21) Appl. No.: 18/570,589

(22) PCT Filed: May 20, 2022

(86) PCT No.: PCT/US2022/030223

§ 371 (c)(1),
(2) Date: Dec. 14, 2023

(87) PCT Pub. No.: WO2023/278062

PCT Pub. Date: Jan. 5, 2023

(65) Prior Publication Data

US 2024/0292158 A1 Aug. 29, 2024

Related U.S. Application Data

(60) Provisional application No. 63/215,504, filed on Jun. 27, 2021.

(51) Int. Cl.
*H04R 25/00* (2006.01)

(52) U.S. Cl.
CPC ............ *H04R 25/30* (2013.01); *H04R 25/70* (2013.01)

(58) Field of Classification Search
CPC ...... H04R 25/30; H04R 25/70; H04R 25/552; H04R 25/558; H04R 2460/17; H04R 25/356; A61B 5/123
See application file for complete search history.

(56) References Cited

U.S. PATENT DOCUMENTS 8,867,764 B1 10/2014 Wiggins et al.
9,031,247 B2 5/2015 Shennib
(Continued)

FOREIGN PATENT DOCUMENTS

AU 2012241067 5/2013
CN 109729485 5/2019
(Continued)

OTHER PUBLICATIONS

English Translation of CN105764018.
(Continued)

*Primary Examiner* — Vivian C Chin
*Assistant Examiner* — Annabelle Kang
(74) *Attorney, Agent, or Firm* — Alan W. Cannon

(57) ABSTRACT

Methods and systems for in-situ hearing assessment and customized fitting of a hearing device that can be implemented by a user of the hearing device. Methods and systems for performing: sending instructions to the hearing device to output audio signals having predefined frequencies and loudness levels; outputting the audio signals to an ear of the user while the hearing device is in an operational position for use by the user; measuring user hearing threshold levels at predefined frequencies based on feedback provided by the user when listening to the audio signals; finding a best fit audiogram, based on comparisons of the measured user hearing threshold levels with hearing thresh-
(Continued)

old levels from a plurality of audiograms stored in memory; and programming the hearing device with the best fit audiogram.

34 Claims, 17 Drawing Sheets

(56) References Cited

U.S. PATENT DOCUMENTS

| | | | | |
|---|---|---|---|---|
| 9,131,321 | B2 | 9/2015 | Sabin | |
| 9,313,583 | B2 | 4/2016 | Rieger et al. | |
| 9,439,009 | B2 | 9/2016 | Kim et al. | |
| 9,693,152 | B2 | 6/2017 | Sabin | |
| 9,723,415 | B2 | 8/2017 | Gran et al. | |
| 9,756,435 | B2 | 9/2017 | Tran et al. | |
| 9,877,117 | B2 | 1/2018 | Sabin | |
| 10,158,956 | B2 | 12/2018 | Theill | |
| 10,455,337 | B2 | 10/2019 | Yoo | |
| 10,499,169 | B2 | 12/2019 | Sigwanz et al. | |
| 10,681,485 | B2 | 6/2020 | Garcia et al. | |
| 2011/0299709 | A1 | 12/2011 | Anderson et al. | |
| 2013/0085411 | A1* | 4/2013 | Van Tasell | A61B 5/12 600/559 |
| 2013/0223634 | A1* | 8/2013 | Rieger | H04R 25/70 381/23.1 |
| 2017/0286918 | A1 | 10/2017 | Westermann et al. | |
| 2019/0274595 | A1 | 9/2019 | Usher | |
| 2020/0260207 | A1 | 8/2020 | Garcia et al. | |
| 2021/0092529 | A1* | 3/2021 | Clad | H04R 25/30 |

FOREIGN PATENT DOCUMENTS

| | | | |
|---|---|---|---|
| CN | 105764018 | 7/2019 | |
| EP | 2396975 | 1/2018 | |
| KR | 101860522 | 5/2018 | |
| WO | 2017158507 | 9/2017 | |
| WO | 2018025250 | 2/2018 | |
| WO | 2018069900 | 4/2018 | |
| WO | WO-2020214482 A1 * | 10/2020 | G16H 10/20 |
| WO | 2021026126 | 2/2021 | |

OTHER PUBLICATIONS

English Translation of CN109729485.
English Translation of KR101860522.
ANSI/ASA 53.6-2010, Specification for Audiometers, Acoustical Society of America, Nov. 2, 2010, pp. 1-55.
Bisgaard et al., "Standard Audiograms for the IEC 60118-I5 Measurement Procedure", Trends in Amplification, I4(2) 113-120, 2010.
Dillon, Hearing Aids, Thieme, pp. 240-241, 2001.
Keidser et al., "Self-Ftting Hearing Aids: Status Quo and Future Predictions", Trends in Hearing, 2016, vol. 20: 1-15.
Liang et al., "Self-Fitting Algorithm for Digital Hearing Aid Based on Interactive Evolutionary Computation and Expert System", Applied Sciences, 2017, 7, 272, pp. 1-19.
Pascoe, "Clinical Measurements of the Auditory Dynamic Range and Their Relation to Formulas for Hearing Aid Gain", Central Institute for the Deaf, 1988.
Sabin et al., "Validation of a Self-Fitting Method for Over-the-Counter Hearing Aids", Trends in Hearing, vol. 24: 1-19, 2020.
Lanman. "Matlab Exercise #3, Design of a Sound Level Meter", EN253, 2005, pp. 1-10.

* cited by examiner

IN-SITU HEARING ASSESSMENT AND CUSTOMIZED FITTING OF HEARING DEVICES

CROSS-REFERENCE

This application is a 371 of International Application No. PCT/US2022/030223, filed May 20, 2022. International Application No. PCT/US2022/030223 claims the benefit of U.S. Application Ser. No. 63/215,504, filed Jun. 27, 2021, which applications are hereby incorporated herein, in their entireties, by reference thereto and to which applications we claim priority.

FIELD OF THE INVENTION

This invention relates to the field of hearing devices. More particularly, this invention relates to systems and methods for in-situ hearing assessment/evaluation and customized fitting of hearing devices.

BACKGROUND OF THE INVENTION

Hearing aids that are sold directly to consumers typically provide an interface, for example, through a mobile phone app that enables users to adjust a gain profile of the hearing aid. For example, the user may be able to select loudness and fine tune the gain. Based on these selections a predetermined audiogram can be selected for the hearing aid. Generally, these interfaces do not mimic the hearing evaluation conducted following clinical practice which measures audiometric thresholds using an audiogram in a quiet environment and then customizes the hearing device based on the evaluation.

While this may be appropriate for users with certain hearing loss profiles, there are likely many more users for which currently provided gain prescription choices are either not appropriate for the specific hearing loss of such users or for which the response obtained is not optimal for such users' sound quality and/or speech intelligibility preferences.

There is a current need in the art to provide for customizing the gain prescription, to make it possible for a user to better adjust his/her hearing device to his/her preference for a variety of situations and environments.

There is a current need to provide users of directly sold hearing devices with the capability of performing a hearing assessment for use in more accurately programming the hearing devices to the users' individual needs.

There is a current need to provide an improved listening experience, and to cater gains to match hearing loss profiles.

There is a current need to allow personal hearing professionals to better address user complaints.

There is a current need to provide improved customer experience with directly sold hearing devices and to reduce return-for-credit rates.

BRIEF DESCRIPTION OF THE DRAWINGS

At least one preferred embodiment of the present invention is shown and described herein. The present invention may include further different embodiments, the details of which may be modified in various, obvious aspects without departing from the scope of the invention. Accordingly, the drawings and descriptions will be regarded as illustrative in nature and not as restrictive.

SUMMARY OF THE INVENTION

Figure 1:
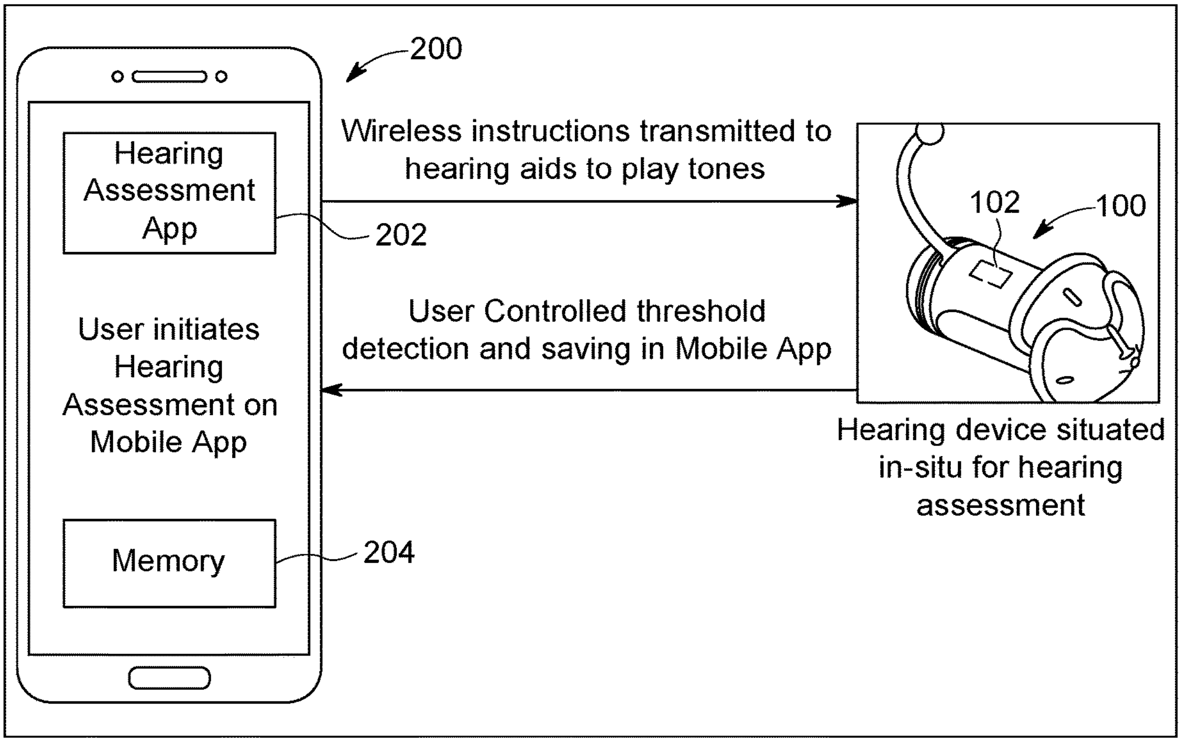
FIG. 1 illustrates a process for determining individual hearing thresholds according to an embodiment of the present invention.

According to an aspect of the present invention, a method of in-situ hearing assessment and customized fitting of a hearing device that can be implemented by a user of the hearing device includes: sending instructions to the hearing device to output audio signals having predefined frequencies and loudness levels; outputting the audio signals to an ear of the user while the hearing device is in an operational position for use by the user; measuring user hearing threshold levels at predefined frequencies based on feedback provided by the user when listening to the audio signals; finding a best fit audiogram, based on comparisons of the measured user hearing threshold levels with hearing threshold levels from a plurality of audiograms stored in memory; and programming the hearing device with the best fit audiogram.

In at least one embodiment, the plurality of audiograms has been pre-calculated using a fitting formula and the memory is a memory of the hearing device.

In at least one embodiment, the method further includes placing the hearing device in a holding device and instructing the holding device to perform the programming.

In at least one embodiment, the sending instructions and instructing the holding device are performed wirelessly by an app operating on a computing device that is separate from the hearing device and separate from the holding device.

In at least one embodiment, the sending instructions and instructing the holding device are performed by an app operating on the holding device.

In at least one embodiment, the holding device comprises a charger, and the method further includes charging the hearing device in the holding device.

In at least one embodiment, the programming comprises directly programming the hearing device by wireless communication.

In at least one embodiment, the wireless communication is sent from an app on a computing device to the hearing device.

In at least one embodiment, the finding of a best fit comprises mapping the hearing threshold levels to audiograms in the plurality of audiograms and selecting gain settings of a best fit audiogram from the plurality of audiograms that also has gain settings within constraints imposed by the hearing device.

In at least one embodiment, the method includes performing an environmental noise check prior to the sending instructions to output audio signals, and preventing the sending instructions to output audio signals unless an environmental noise level below a predetermined threshold noise level is detected.

In at least one embodiment, the method includes further determining whether to calculate an estimate of a hearing threshold value at a first of the predefined frequencies based upon a hearing threshold value at a second of the predefined frequencies, wherein the estimate is calculated when the determined user hearing threshold level at the first frequency is greater than the determined user hearing threshold level at the second frequency by more than a predetermined value.

In at least one embodiment, the method includes further determining whether an unexpected lowered threshold (referred to as a spike) occurs in one or more of the hearing threshold levels at predefined frequencies; and correcting any of the hearing threshold levels at predefined frequencies where a spike has been determined to occur.

In at least one embodiment, the finding of a best fit audiogram comprises selecting the audiogram determined to have a lowest target score; wherein target scores are calculated by: calculating an average hearing threshold level of the determined user hearing threshold levels at predefined frequencies; calculating an average audiometric slope per octave from the determined user hearing threshold levels at predefined frequencies; for each of the plurality of audiograms, calculating an absolute hearing level difference between the average hearing threshold level of the determined user hearing 1 threshold levels and an average hearing threshold level of the audiogram; and calculating an absolute slope difference between the average audiometric slope per octave from the determined user hearing threshold levels and an average audiometric slope per octave from the audiogram; wherein a target score is calculated to be a sum of the absolute hearing level difference and the absolute slope difference.

In at least one embodiment, the hearing device is a first hearing device, the method being repeated for a second hearing device, wherein the first and second hearing devices are for use in left and right ears of the user, respectively; and the method further includes: determining if there is a significant asymmetry in hearing loss between the left and right ears of the user by comparing the hearing threshold levels at predefined frequencies for the first device to the respective hearing threshold levels at predefined frequencies for the second device; and calculating mean hearing threshold levels at predefined frequencies from the hearing threshold levels at predefined frequencies for the first and second devices when the absolute hearing threshold level difference between the first and second devices, for any measured frequency, does not exceed a predetermined threshold difference; wherein the finding a best fit audiogram comprises comparing the mean hearing threshold levels with the hearing threshold levels from the plurality of audiograms stored in memory; and wherein both the first and second hearing devices are programmed with the same best fit audiogram.

In at least one embodiment, the hearing device is a first hearing device, and the method is repeated for a second hearing device, wherein the first and second hearing devices are for use in left and right ears of the user, respectively; and the method further includes: determining if there is a significant asymmetry in hearing loss between the left and right ears of the user by comparing the hearing threshold levels at predefined frequencies for the first device to the respective hearing threshold levels at predefined frequencies for the second device; and when it is determined that there is a significant asymmetry, the finding a best fit audiogram comprises finding best fit audiograms individually for the first and second devices; and the first and second hearing devices are programmed with the individually found best fit audiograms.

In at least one embodiment, creation of the audiograms stored in memory comprises calculating insertion gains for audiogram hearing threshold levels for the audiograms.

In at least one embodiment, at least one of the audiograms stored in memory have been customized by adjusting at least one of expansion threshold, low level threshold, high level threshold, low level gain, high level gain and/or output limit.

According to another aspect of the present invention, a method of detecting and correcting spikes in individual hearing threshold levels measured during an in-situ hearing assessment procedure, includes: the method comprising: determining whether there is a sloping pattern in a plot of the individual hearing threshold levels to frequencies at which the individual hearing threshold levels were measured, respectively; when a sloping pattern has been determined, further determining whether an intermediate individual hearing threshold level measured at an intermediate frequency that is intermediate of a relatively high frequency at which another individual hearing threshold level was measured, and a relatively low frequency at which still another individual hearing threshold level was measured is less that the hearing threshold level measured at the relatively low frequency by a value greater than or equal to an offset value; and correcting the intermediate individual hearing threshold level when the intermediate individual hearing threshold level is less than the hearing threshold level measured at the relatively low frequency by a value greater than or equal to the offset value.

In at least one embodiment, the intermediate individual hearing threshold level is a first intermediate individual hearing threshold level and the intermediate frequency is a first intermediate frequency, and the method further includes: determining whether a second intermediate individual threshold level measured at a second intermediate frequency less than the higher frequency but greater than the first intermediate frequency, is less than the individual hearing threshold level measured at the relatively low frequency by an amount greater than or equal to a second predetermined offset value; and correcting the second intermediate individual hearing threshold level when the second intermediate individual hearing threshold level is less than the hearing threshold level measured at the relatively low frequency by a value greater than or equal to the second offset value.

In at least one embodiment, the second offset value equals the first offset value.

In at least one embodiment, the correction of the intermediate individual hearing threshold level comprises correcting the intermediate individual hearing threshold level to be equal to the relatively low frequency individual hearing threshold level plus the offset value.

In at least one embodiment, the correction of the second intermediate individual hearing threshold level comprises correcting the second intermediate individual hearing threshold level to be equal to an average of the first intermediate individual hearing threshold level having been corrected if needed, and the individual hearing threshold level measured at the high frequency.

In at least one embodiment, the intermediate individual hearing threshold level is a first intermediate individual hearing threshold level; and the correction of the second intermediate individual hearing threshold level comprises correcting the second intermediate individual hearing threshold level to be equal to an average of the first intermediate individual hearing threshold level having been corrected if needed, and the individual hearing threshold level measured at the high frequency.

According to another aspect of the present invention, a system for in-situ hearing assessment and customized fitting of a hearing device that can be implemented by a user of the hearing device includes: a hearing device; a non-transitory computer-readable storage medium comprising stored computer program instructions executable by at least one processor of the system, the instructions, when executed, causing the processor to send instructions to the hearing device to output audio signals having predefined frequencies and loudness levels; wherein, upon outputting the signals to an ear of the user while the hearing device is an operational position for use by the user, the stored computer program instructions being further executable by the at least one processor to receive feedback input from the user regarding whether the user hears the output audio signals, and to determine user hearing threshold levels at predefined frequencies based on the feedback input provided by the user when listening for the audio signals; the stored computer program instructions being further executable by the at least one processor to find a best fit audiogram, based on comparisons of the user hearing threshold levels with hearing threshold levels from a plurality of audiograms stored in memory; and to programming the hearing device with the best fit audiogram.

In at least one embodiment, the stored computer program instructions are provided in an app executable on a smartphone, hearing aid charger, laptop computer, or desktop computer.

In at least one embodiment, the system further includes a holding device to which the hearing device can be docked, the holding device being configured to program the hearing device with the best fit audiogram.

In at least one embodiment, the stored computer program instructions are configured to be executable by the at least one processor of a computing device external to the holding device, and the at least one processor external to the holding device sends instructions to the holding device to program the hearing device with the best fit audiogram.

In at least one embodiment, the holding device comprises the processor provided with the computer program instructions executable to send the instructions to the hearing device.

In at least one embodiment, the holding device comprises a charger configured to also charge a battery of the hearing device.

In at least one embodiment, the stored computer program instructions are configured to be executed by the at least one processor to wirelessly send the instructions to the hearing device.

In at least one embodiment, the stored computer program instructions are configured to be executed by the at least one processor to wirelessly send instructions to the holding device to program the hearing device with the best fit audiogram.

In at least one embodiment, the stored computer program instructions are configured to be executed by the at least one processor of a smart phone.

In at least one embodiment, the stored computer instructions are stored in the holding device and are configured to be executed by at least one processor in the holding device.

In at least one embodiment, finding the best fit comprises mapping the hearing threshold levels to audiograms in the plurality of audiograms and selecting gain settings of a best fit audiogram from the plurality of audiograms that also has gain settings within constraints imposed by the hearing device.

In at least one embodiment, the stored computer program instructions are executable by the at least one processor of the system to perform an environmental noise check prior to sending the instructions to the hearing device to output audio signals.

In at least one embodiment, the stored computer program instructions are executable by the at least one processor of the system to prevent sending the instructions to output audio signals unless an environmental noise level below a predetermined threshold noise level is detected.

In at least one embodiment, the stored computer program instructions are executable by the at least one processor of the system to determine whether to calculate an estimate of a hearing threshold value at a first of the predefined frequencies based upon a hearing threshold value at a second of the predefined frequencies, wherein the estimate is calculated when the determined user hearing threshold level at the first frequency is greater than the determined user hearing threshold level at the second frequency by more than a predetermined value.

In at least one embodiment, the stored computer program instructions are executable by the at least one processor of the system to: calculate an average hearing threshold level of the determined user hearing threshold levels at predefined frequencies; calculate an average audiometric slope per octave from the determined user hearing threshold levels at predefined frequencies; for each of the plurality of audiograms, calculate an absolute hearing level difference between the average hearing threshold level of the determined user hearing threshold levels and an average hearing threshold level of the audiogram; calculate an absolute slope difference between the average audiometric slope per octave from the determined user hearing threshold levels and an average audiometric slope per octave from the audiogram; and calculate a target score as a sum of the absolute hearing level difference and the absolute slope difference; wherein finding the best fit audiogram comprises selecting the audiogram determined to have a lowest target score among the target scores calculated.

In at least one embodiment, the system includes a pair of the hearing devices; first and second hearing devices of the pair of hearing devices being provided for left and right ears of the user, wherein the computer program instructions are executable by the at least one processor to send the instructions to each of the first and second hearing devices, and receive the feedback input from the user regarding each of the first and second hearing devices; and wherein the computer program instructions are further executable by the at least one processor to determine if there is a significant asymmetry in hearing loss between the left and right ears of the user by comparing the hearing threshold levels at predefined frequencies for the first device to the respective hearing threshold levels at predefined frequencies for the second device; and to calculate mean hearing threshold levels at predefined frequencies from the hearing threshold levels at predefined frequencies for the first and second devices when the absolute hearing threshold level difference between the first and second devices, for any measured frequency, does not exceed a predetermined threshold difference; wherein the best fit audiogram is found by comparing the mean hearing threshold levels with the hearing threshold levels from the plurality of audiograms stored in memory; and wherein both the first and second hearing devices are programmed with the same best fit audiogram.

In at least one embodiment, the system includes a pair of the hearing devices; first and second hearing devices of the pair of hearing devices being provided for left and right ears of the user, wherein the computer program instructions are executable by the at least one processor to send the instructions to each of the first and second hearing devices, and receive the feedback input from the user regarding each of the first and second hearing devices; and wherein the computer program instructions are further executable by the at least one processor at least one processor to determine if there is a significant asymmetry in hearing loss between the left and right ears of the user by comparing the hearing threshold levels at predefined frequencies for the first device to the respective hearing threshold levels at predefined frequencies for the second device; and when it is determined that there is a significant asymmetry, the best fit audiogram comprises a first best fit audiogram found for the first hearing device and a second best fit audiogram found for the second hearing device; and the first and second hearing devices are programmed with the individually found first and second best fit audiograms, respectively.

In at least one embodiment, the audiograms stored in memory are customized by calculating insertion gains for audiogram hearing threshold levels for the audiograms.

In at least one embodiment, at least one of the audiograms stored in memory have been customized by adjusting at least one of expansion threshold, low level threshold, high level threshold, low level gain, high level gain and/or output limit.

These and other advantages and features of the invention will become apparent to those persons skilled in the art upon reading the details of the invention as more fully described below.

DETAILED DESCRIPTION OF THE INVENTION

Before the present systems, apparatus and methods are described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein, in their entireties, by reference thereto, to disclose and describe the methods and/or apparatus in connection with which the publications are cited.

It must be noted that as used herein and in the appended claims, the singular forms “a”, “an”, and “the” include plural referents unless the context clearly dictates otherwise. Thus, for example, reference to “a device” includes a plurality of such devices and reference to “the tone” includes reference to one or more tones and equivalents thereof known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

ABBREVIATIONS/DEFINITIONS

CORFIG: Coupler response for flat insertion gain
dB HL: Decibels Hearing Level
HA: Hearing Assessment
HI: Hearing Instrument
LDL: Loudness Discomfort level
LTASS: Long-term average speech spectrum
MLE: Microphone location effect
PHP: Personal Hearing Professional
REIG: Real Ear Insertion Gain
RETSPL: Reference equivalent threshold sound pressure level
REUG: Real Ear Unaided Gain
RECD: Real ear to coupler difference A "hearing device", as used herein, refers to a hearing instrument (HI), such as a hearing aid, assistive listening device, personal sound amplification product, ear bud, or other device that is used to facilitate improvement of a user's hearing.

A "target audiometric response" as used herein, refers to an audiometric response selected by a fitting algorithm to be a closest fit to a patient's audiometric threshold.

DETAILED DESCRIPTION

The present invention provides improved ability for a user to customize hearing devices to the user's own particular needs. As noted above, for many users, the currently available gain prescriptions provided for hearing devices may not be appropriate for their specific hearing loss, or the response obtained by selecting a currently available gain prescription to be applied to a hearing device may not be optimal for a user's sound quality preference. The present invention provides the ability to customize the gain prescription, so as to make it possible for users to better adjust their hearing devices to their preferences for a variety of situations and environments. This customization can therefore provide an improved listening experience, cater gains to match the hearing loss profiles of users, and/or allow personal hearing professionals to better address user complaints. These advantages may lead to improved customer experiences and reduce return-for-credit rates.

The prescription of customized hearing device fitting involves determining a hearing threshold of the user, finding a best fit customized audiogram for each hearing threshold, and programming the best fit customized audiogram to a hearing device to be used by the user.

FIG. 1 illustrates a process for determining hearing thresholds according to an embodiment of the present invention. In the embodiment shown, an app 202 for carrying out hearing assessment for determination of hearing thresholds is provided on a smart phone 200. In alternative embodiments, an app or other interface could be provided in a holding device such as a hearing aid charger, on a laptop computer, on a desktop computer, or on some other computing device. In the embodiment of FIG. 1, the app 202 is configured, when run by the processor of the smart phone 200 to send instructions to the hearing device 100 and to receive feedback from a user as to whether the user hears a tone outputted by the hearing device 100, as instructed by the app 202. In FIG. 1, the hearing device 100 is a completely-in-the-canal type hearing aid, but could alternatively be some other type of hearing aid, such as in the ear, behind the ear, or other type or another type of hearing device such as ear buds.

Figure 2:
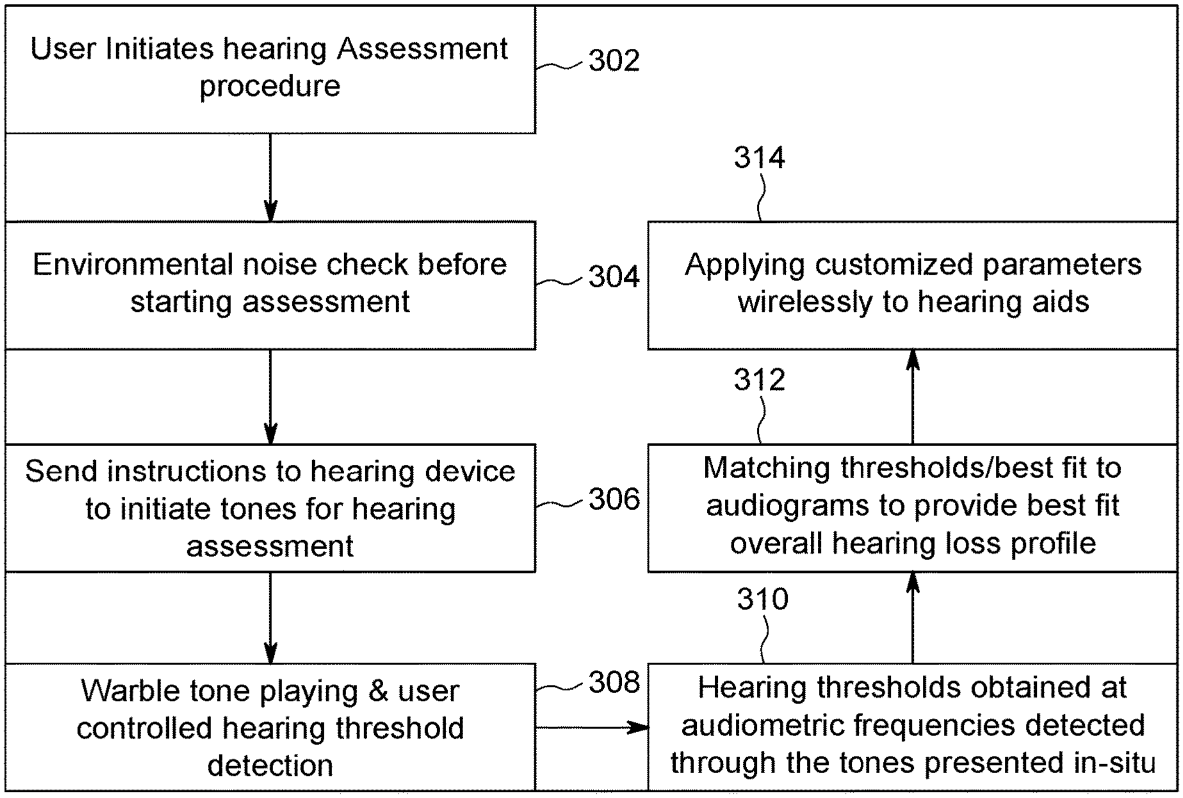
FIG. 2 is a block diagram showing events that may be carried out during a process of hearing assessment and custom fitting of a hearing device according to an embodiment of the present invention.
Figure 3:
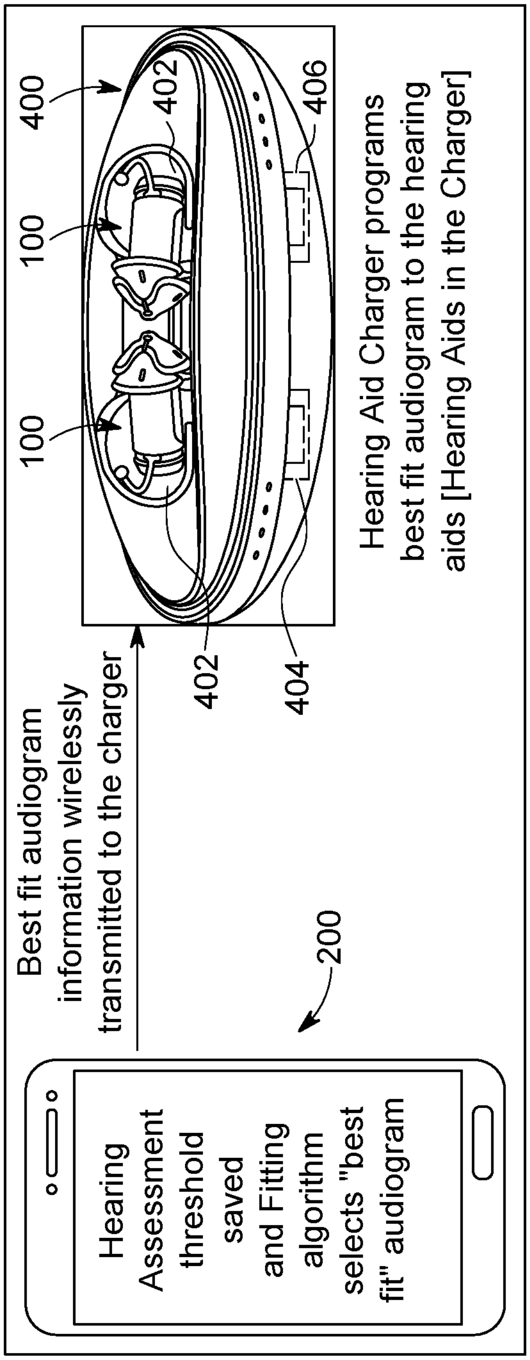
FIG. 3 illustrates preferred hearing devices being programmed wirelessly by an app of a mobile device, after placing the hearing devices in the cradle of a device, according to an embodiment of the present invention.

FIG. 2 is a block diagram showing events that may be carried out during a process of hearing assessment and custom fitting of a hearing device 100 to meet a particular user's particular needs, according to an embodiment of the present invention. At event 302, the user initiates a hearing assessment procedure. In the embodiment of FIG. 1, the user can initiate the hearing assessment procedure on the app 202. In other embodiments, the procedure could be initiated on a charger or on another computing device configured to run a hearing assessment procedure according to the present invention.

At event 304, the app 202 (or other software in alternative embodiments) checks for environmental noise before initiating the hearing assessment. Additionally, the procedure (app or other arrangement) continually monitors for environmental noises during the procedure. A quiet environment with the background (environmental) noise below a predetermined threshold is needed to obtain an accurate hearing threshold of the user, and event 304 first confirms that a quiet environment (defined by the environmental noise being below the predetermined threshold noise level) exists before event 306 can be carried out. The predetermined threshold for a quiet environment is currently 60 dBA, but could be within a range from about 45-65 dBA, for example. Also, this value can be changed as needed.

Once it has been determined at event 304 that a quiet environment exists, instructions are sent to the hearing device 100 at event 306 to initiate tones to be played from the hearing device 100. In the embodiment using the app 202, the instructions are sent wirelessly from the smart phone 200 to the hearing device 100. Instructions can be sent similarly in other embodiments. Alternatively, in embodiments where a charger is used to provide the instructions, these could be sent by hardwire connection, such as by connection of the hearing device 100 to the charger via contacts. Further alternatively, a speaker could be provided in the charger to send encoded tones (instructions) to the hearing device, or instructions could be sent from the charger (or app) to the hearing device via Bluetooth (BLE communication. The order in which signal frequencies are tested and the order of testing signals relative to left versus right ear can be is not critical and can be done in any order.

The app, or other interface is also configured to interface with the user and instructs the user to place the hearing device 100 in the operational position (i.e., in the case of an in the canal hearing aid, in the hearing canal, but, alternatively, different positions may be used for different types of hearing devices) so that the hearing assessment can be performed in-situ. The instructions (commands) that are sent to the hearing device for initiating the hearing assessment check at event 306 instruct the hearing device 100 to output tonal signals at various frequencies and levels. For example, calibrated warble tones can be instructed and played at event 308 (such as by outputting the tones from receiver 104 or other output configuration) on one hearing device 100 at a time beginning with the left (or right) ear at predefined frequencies (e.g., but not limited to: 1 KHz, 2 KHz, 3 KHz, 4 KHz & 500 Hz) and then at the opposite ear (for same frequencies and order as the first ear). When the hearing device is a hearing aid, such as 100 in FIG. 1, the hearing device also includes a microphone 106 for receiving environmental sounds to be processed by the hearing aid and outputted through the receiver 104. Typically, the microphone 106 is muted or temporarily disabled during a hearing assessment process. The presentation levels of each warble tone are designed to vary. As one non-limiting example, the presentation levels may range from 77 dB HL (decibels hearing level) to 15 dB HL (RETSPL (reference equivalent threshold sound pressure level)) in 8 dB decrements. The threshold (volume threshold level) for each frequency is recorded as the lowest audible level at which the tone is detected. Thus, for each level, the user presses or otherwise inputs a response that they have heard the test signal at that level, until they get to the signal (tone) volume level that they do not hear, to which they input "No" or that they did not hear the signal. Upon completion of the assessment across both ears, the hearing threshold levels are obtained at event 310 and saved in memory 204 accessible to the mobile app 202, which may be on the smart phone 200, in the cloud, or at some other location of memory that is accessible by the app 202 via the smart phone 200. Likewise, other embodiments of control/interface may store these values in local memory and/or in the cloud and/or other location in which accessible memory is located.

Alternatively, the hearing assessment processing can be carried out on only one ear/hearing device 100, if desired. The typical case involves assessing both ears and a pair of hearing devices however.

Once the hearing assessment has been completed, the hearing threshold levels (hearing thresholds) are used to determine a best fit match to audiograms to provide a best fit overall hearing loss profile for the user at event 312. A fitting algorithm is provided in the app 202 or alternative control interface to determine the best fit audiogram matching to the hearing thresholds obtained from hearing assessment. The audiograms that the fitting algorithm matches the hearing thresholds to are pre-calculated using the NAL-R fitting formula and are saved in memory 102 of the hearing device, preferably firmware memory. The NAL-R fitting formula is a hearing aid gain fitting formula developed by the National Acoustics Laboratory (NAL). This formula or a variant of this formula is widely adopted in the industry for gain prescriptions in hearing aids.

Upon matching the hearing thresholds to the audiograms to determine the best fit audiogram, the best fit audiogram is programmed to the hearing device(s) at event 314. In a preferred embodiment, the hearing devices 100 can be programmed wirelessly by placing the hearing devices 100 in the cradle 402 of a device 400, after which the app 202 wirelessly instructs the device 400 to program the audiogram into the hearing devices 100. Alternatively the hearing devices 100 can be directly programmed from the app 202 to the hearing devices 100 by wireless communication such as Bluetooth® or the like. Preferably the device 400 is also a charger which is configured to charge the batteries of the hearing devices 100 when the hearing devices are docked in the cradle 402. In either case, the device or charger 400 may be configured with an app 404 that can be alternatively operated in conjunction with processor 406 to perform the same functions as the app 202 and mobile phone 200, without any input from the app 202/phone 200. In any of these variants, the programming of the audiogram into the hearing device(s) provides the user with a customized gain prescription matching their hearing thresholds. The thresholds are mapped to a pre-stored list of audiograms and the gain settings are selected based on an audiogram list given the constraints imposed by the hearing device that is to be programmed. According to the present invention, a prescription procedure is provided that indicates how to fit linear hearing devices to users. As noted above, the NAL-R fitting formula is used. However, the hearing devices that are being fitted are non-linear; so the NAL-R fitting formula is customized in order to provide a more linear fit of the hearing device to the user. Alternative fitting algorithms, including but not limited to customized algorithms, could be substituted for the NAL-R algorithms described. Further alternatively, variants of the NAL-R algorithms described could be used.

As noted above, the hearing assessment may be controlled via an app on a mobile device, such as a phone, tablet, laptop computer or other computing device. Hearing devices sold directly to consumers may provide an interface, for example, through a mobile phone app that enables users to conduct hearing evaluation and select their preferred gain profile. A hearing assessment is preferably provided via an iOS or Android mobile device (phone 200, tablet, laptop, or other mobile device). However, for those customers that do not have a mobile device, the hearing assessment may potentially be available via a device 400, such as charger 400 or other device having a processor and software configured to control and carry out the hearing assessment. The assessment may present tones, which may be warble tones, speech, music, single frequency tones and/or noises to the customer via in-situ hearing device(s) 100. The tones, in one non-limiting example, may be warble tones centered (fc) at 500, 1000, 2000, 3000, and 4000 Hz, have a frequency modulation (fm) of +/−5% relative to fc, and a modulation rate of 5 Hz. In addition, the test signal (i.e., warble tone in this example) is specified to have a duration of 400 ms followed by 400 ms of silence, which repeats until the user progresses to the next test signal or when the hearing assessment is complete.

Thus, when a hearing device 100 is instructed to play warble tones as test signals, for each warble tone played, the signal frequency begins at fc. The signal frequency shifts from fc to fc+5% over 100 ms time interval. The signal frequency then shifts back from fc+5% to fc−5% over a 200 ms time interval, and the signal frequency than again shifts from fc−5% to fc over the next 100 ms time interval. It is noted that the stated time intervals and percentage shifts are exemplary only and may vary, as the present invention is not limited to these specific time interval and percentage values.

The test signals used are preferably, but not necessarily based upon the standard warble tone signals used in conventional audiometry. The presentation level for each warble tone may range from 15 dB HL (RETSPL) to 77 dB HL in 2 dB increments. This range represents the border of normal sensitivity at 15 dB HL to the middle of the severe range at 77 dB HL. This hearing sensitivity range is thought to cover the significant majority of direct customers.

Figure 4:
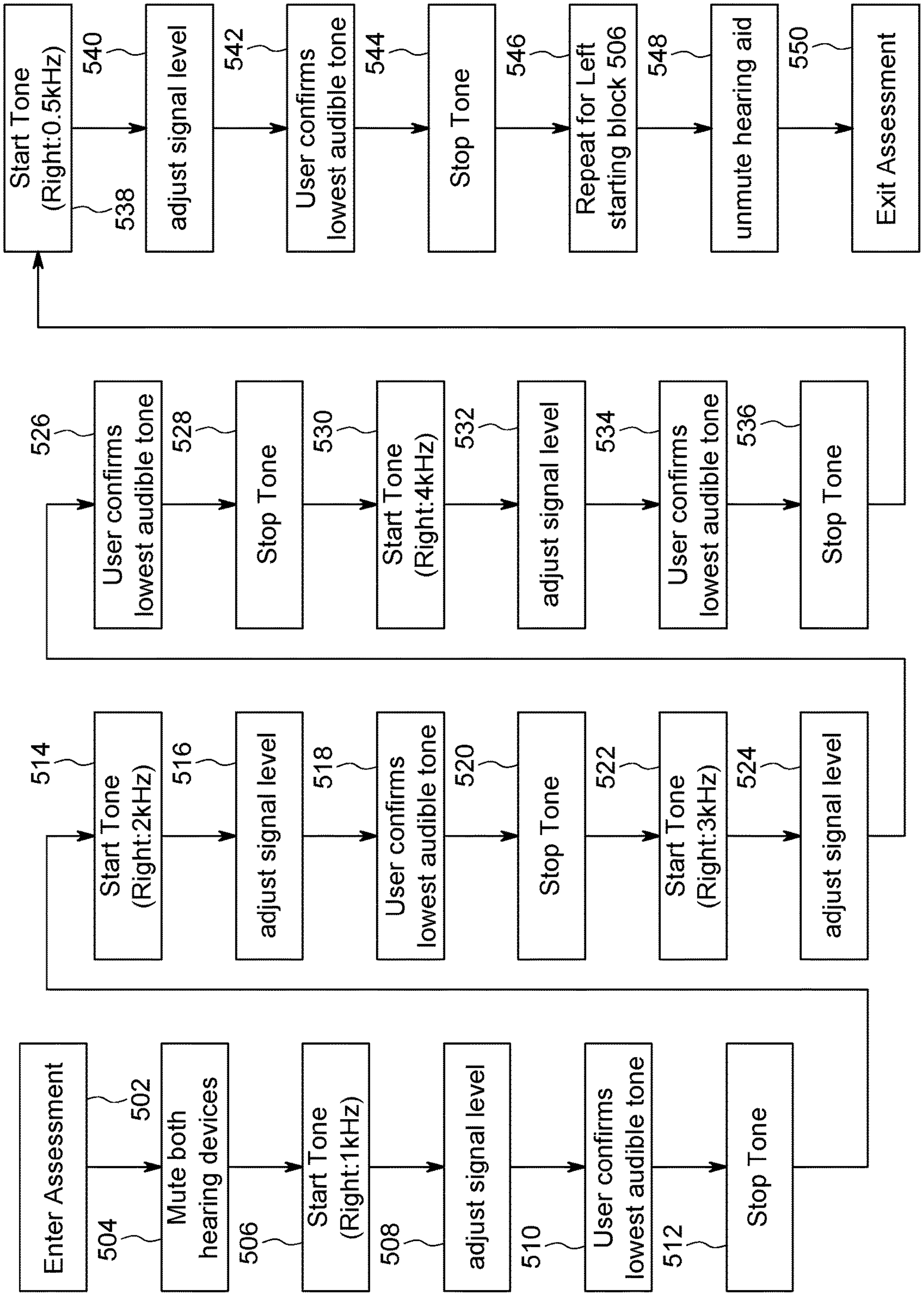
FIG. 4 is a flow chart illustrating events that may be carried out in performing an in-situ hearing assessment test for a right side ear of a user, according to an embodiment of the present invention.

The hearing assessment task for each test signal may be based on a modified Hughson-Westlake procedure. FIG. 4 is a flow chart illustrating events that may be carried out in in performing an in-situ hearing assessment test using a Hughson-Westlake method, according to an embodiment of the present invention. It is noted that the same procedure can also be followed for performing an in-situ hearing assessment of the left side ear, by simply substituting "left" wherever the word "right" appears in the flow chart of FIG. 4. Although specific frequencies are noted as being used for the test signals, as noted above, these frequencies could be predetermined as some other predetermined values without departing from the events as carried out for hearing assessment, but the specific frequencies noted are currently the best mode for carrying out the procedure.

At event 502 a hearing assessment is initiated. At Event 504 the hearing device 100 (both hearing devices 100 in the most common occurrence where a pair of hearing devices are to be programmed) is/are muted. The first test signal is then initiated from the right side hearing device 100 at event 506. In this example, the first test signal is a signal having a frequency of 1 kHz. The signal may be initiated at a volume level of 77 dB, and this may be the same for each different test signal upon initiation. In this example, the first test frequency is at 1000 Hz (event 506) and subsequent test frequencies may be at 2000 (event 514), 3000 (event 522), 4000 (event 530) and 500 Hz (event 538). For each test frequency and volume level, the user provides a yes or no response (could be verbally or input manually to the app or other controlling interface) as to whether the signal was heard. If the user hears the test frequency and thus provides a "yes" response at 77 dB, then the app or other controlling interface decreases the volume of that signal by a first predetermined amount (e.g., by 8 dB, although this could be a different predetermined value), at event 508, 516, 524, 532 and/or 540. For each test signal, this procedure is repeated each time the user provides a response that the reduced volume signal is heard. Thus, after each response, the volume of the test signal is again lowered by the predetermined amount (e.g., 8 dB) and the user provides a response when the lowered level test signal is heard. When the volume of the test signal is eventually lowered to a volume level that cannot be heard by the user, the user responds with a "no" response that the test signal could not be heard, or the app/control program assumes that the user cannot hear this tone if no response from the user is received by a predetermined time period after cessation of the last played lower volume test signal.

The test signal is next increased in volume by a second predetermined amount (e.g., 4 dB, although this value could vary, but is less than the first predetermined amount by which the test signal has been lowered in volume). If the app/control software does not receive a response from the user that the user has heard this increased volume test signal by a predetermined time after the signal is played or if the user responds with a "no" response, then the test signal is again increased in volume by the second predetermined amount, and this process iterates until the app/control software receives a "Yes" response that the user has heard the latest test signal played. Upon receiving the "yes" response, the test signal is thereafter lowered by the first predetermined amount in a process referred to as bracketing the threshold volume level for each test signal frequency. If the lowered signal is not heard, then the signal is again raised by the second predetermined amount stepwise until the signal is again heard.

To determine final response the threshold must be responded to by a predetermined number of times during the testing, e.g., must be heard 50% of the time or in 2 out of 4 presentations, or some other predetermined percentage. Also the responses must be received from the user at times during the procedure when the volume of the test signal is being increased (i.e., when ascending). For example, when decreasing a test signal by 8 dB the initial descending response is not counted as one of the 2 necessary responses. When increasing the test signal by the second predetermined amount, a response will count toward one of the necessary response counts toward defining the threshold. The use of a smaller second predetermined amount than the first predetermined amount enables the process to converge on the threshold volume to be used.

Once the threshold volume of a test signal has been identified (event 508, 516, 524, 532, 540) by the process described above, the app/controlling software instructs the hearing device to play the particular test signal at the threshold volume and the user confirms whether the threshold volume can be heard (events 510, 518, 526, 534, 542). If a response is received that the threshold volume can be heard, then the processing for that particular frequency of test signal is completed (stop tone, event 512, 520, 528, 536) and the processing advances to the next frequency test signal. If the processing has completed the last frequency test signal, then the processing is stopped at event 544 (stop tone) and processing for the other ear begins at event 546, wherein the same processing described above for the right ear is repeated for the left ear. Alternatively, this processing could be carried out for only the right or only the left ear, but these are less often what is generally processed.

If at any of events 510, 518, 526, 534, or 542 a response is not received after a predetermined time period from playing the threshold level of the test signal, then this indicates to the app/controlling software that that the threshold volume of the test signal cannot be heard by the user, and processing returns to the previous event to increase the volume level of the threshold test signal, in a manner as described above and to repeat the threshold bracketing process to identify an updated threshold level that is typically higher than the original threshold level. The updated threshold level of the test signal is then again played (event 510, 518, 526, 534 or 542) and this process is repeated until it is confirmed by a response that the user can hear the current threshold level of the test signal.

Upon completing the identification of the test signal volume threshold levels for all frequencies, the hearing device(s) can be unmuted at event 548 and the assessment procedure is completed at event 550.

Figure 5:
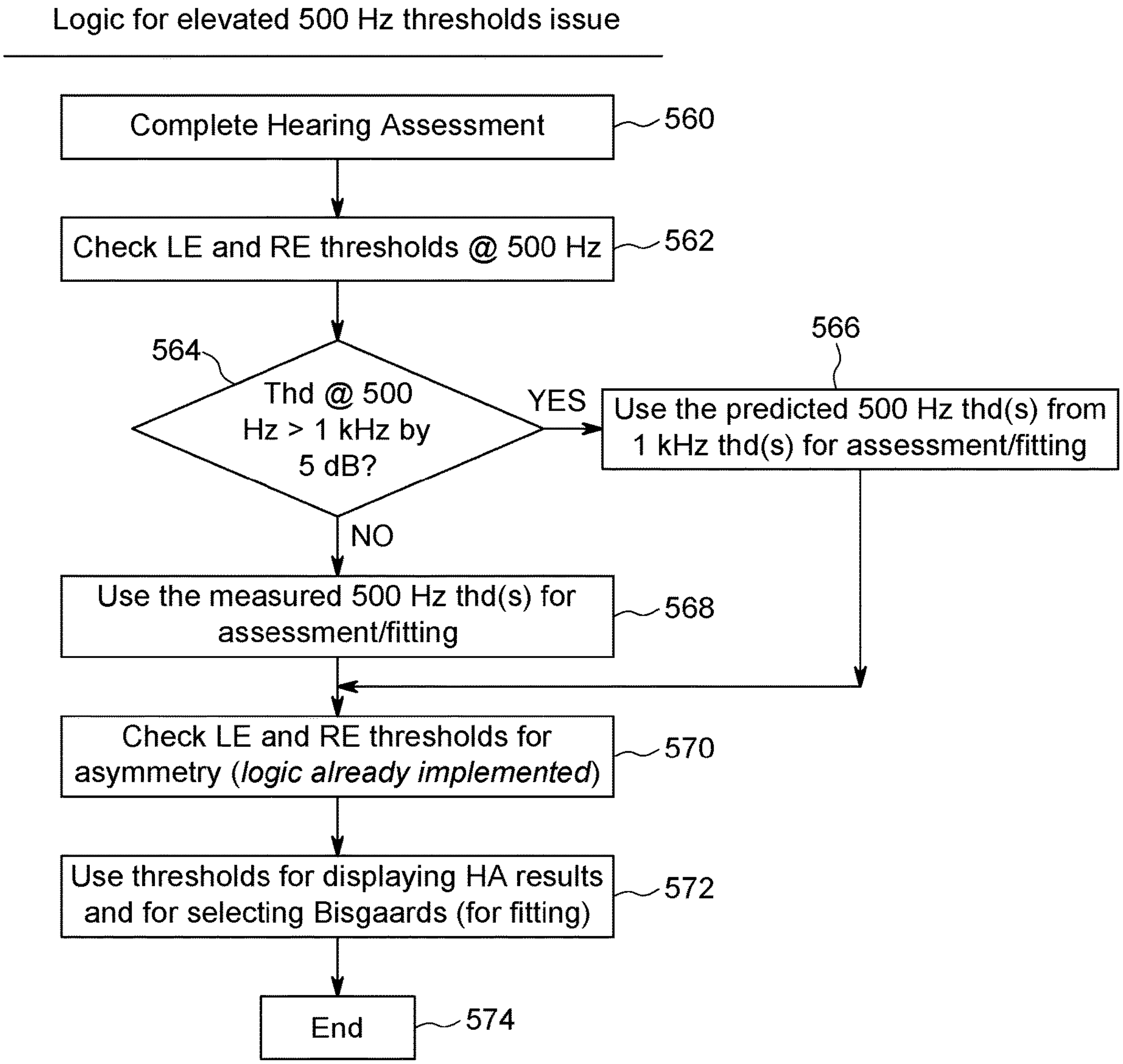
FIG. 5 is a flow chart showing events that may be carried out for determining whether to calculate an estimate for a threshold, according to an embodiment of the present invention.

In some instances of assessment there can be large variability in the responses received when assessing hearing with a test signal beginning at a frequency of 500 Hz. This variability can be due to ambient noise, positioning or placement of the hearing device within the ear canal and/or issues with wireless communication, among other factors. In order to account for this, one option is to set an assessment criteria based on the threshold level determined for the test signal beginning 1 KHz. FIG. 5 is a flow chart showing events that may be carried out for determining whether to calculate an estimate for a threshold at the signal level of 500 Hz. At event 560, after completing a hearing assessment (such as at event 550 in FIG. 4, for example), a procedure of determining whether to use a measured or a predicted (estimated) threshold value for the 500 Hz signal is initiated. At event 562 the left ear and right ear thresholds that were measured for the 500 Hz test signal are checked and at event 564 they are compared to the left ear and right ear thresholds measured for the 1 KHz test signal respectively. If the threshold level measured for a 500 Hz test signal is greater than the measured threshold level for a 1 KHz test signal on the same ear by a predetermined criterion (in the embodiment of FIG. 5 the criterion is 5 dB, but a different predetermined criterion could be used), then a predicted/estimated threshold level is calculated for the 500 Hz signal based on the measured 1 KHz signal at event 566. On the other hand, if the threshold level measured for a 500 Hz test signal is not greater than the measured threshold level for a 1 KHz test signal on the same ear by the predetermined criterion amount, then the measured threshold level for the 500 Hz signal is used as the threshold for the 500 Hz signal at event 568.

For example, as noted above a prediction or estimate for the threshold level at 500 Hz can be calculated from the measured 1 KHz threshold (measured according to the procedure described above) using linear regression. Using a total number N=16437 of audiograms for these analyses/evaluations, with criteria=5 dB, the threshold value for the 500 Hz test signal Y can be calculated as a function of the threshold value for the 1 KHz test signal as follows:

$$Y = 0.73 * X + 4.4 \tag{1}$$

where X is the measured threshold value at 1 kHz; and

Y is the predicted threshold value at 500 Hz.

Figure 6:
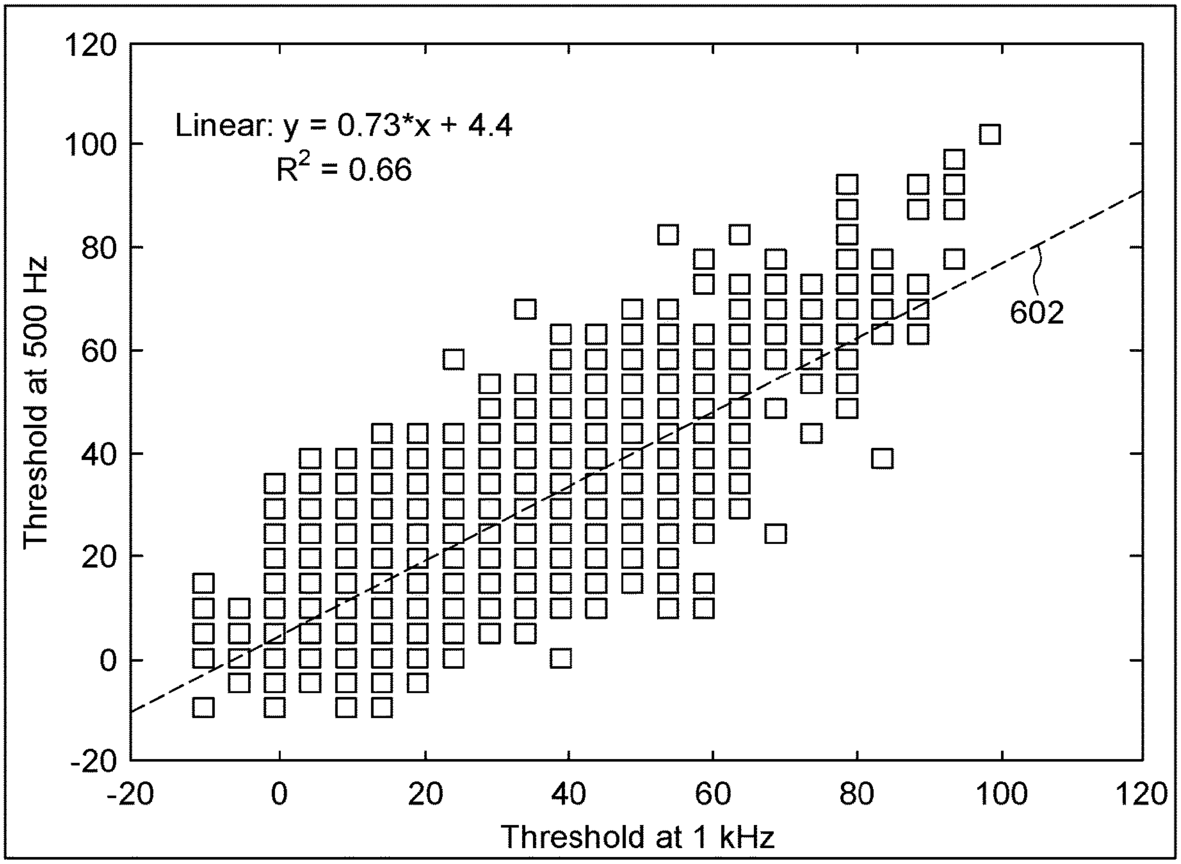
FIG. 6 is a graph that plots predicted threshold values of test signals at 500 Hz on the Y-axis versus measured threshold values of test signals at 1 KHz on the X-axis, according to an embodiment of the present invention.

FIG. 6 is a graph that plots predicted threshold values of test signals at 500 Hz on the Y-axis versus measured threshold values of test signals at 1 KHz on the X-axis, wherein the predicted values Y are calculated as a function of the measured values X according to the formula Y=0.73X+4.4, and the measured threshold values were measured according to the procedure described with regard to FIG. 4. The dashed line 602 indicates the linearity of the results of these calculated predictions with an $R^2$ value of 0.66. The statistically predicted linear fit 602 is with $p<0.001$.

Figure 7:
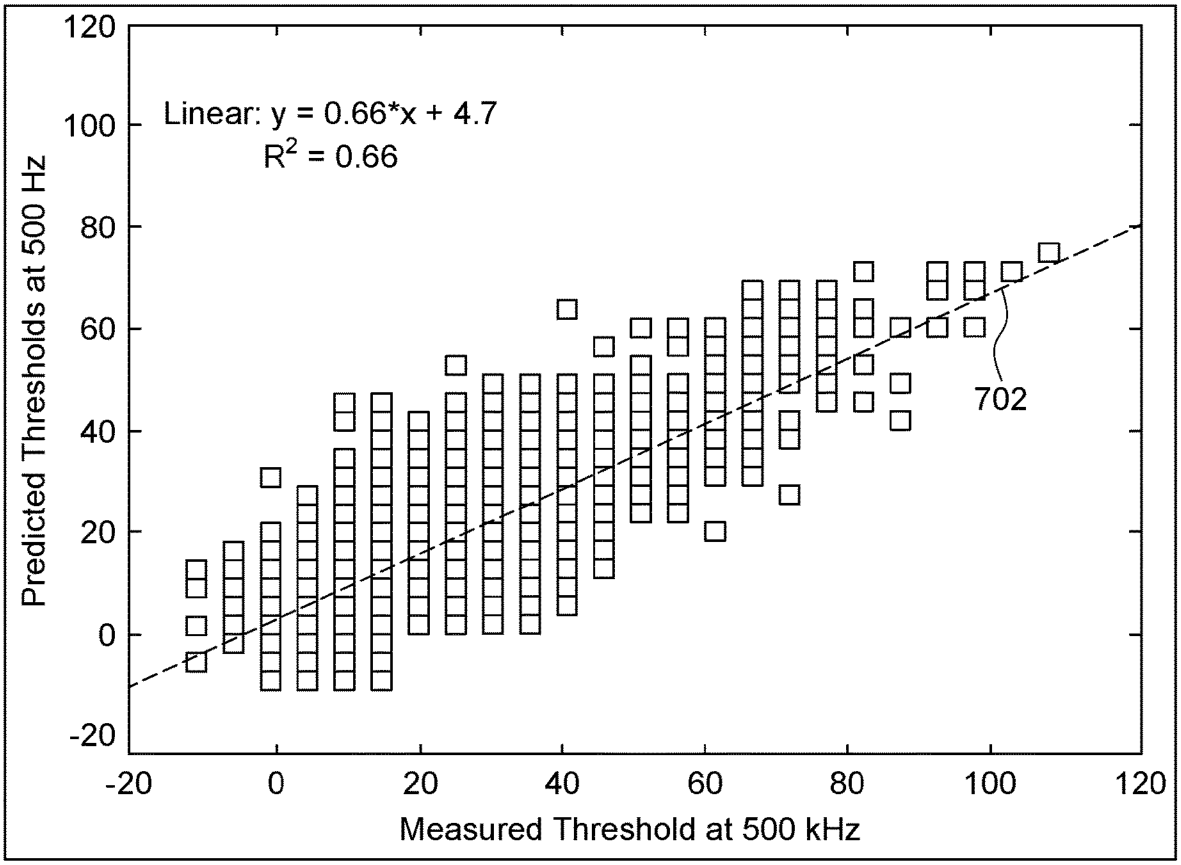
FIG. 7 is a graph that plots predicted threshold values of test signals at 500 Hz on the Y-axis versus measured threshold values of test signals at 500 Hz on the X-axis, according to an embodiment of the present invention.

FIG. 7 is a graph that plots predicted threshold values of test signals at 500 Hz on the Y-axis versus measured threshold values of test signals at 500 Hz on the X-axis, wherein the predicted values Y are calculated as a function of the measured values of the test signals at 1 KHz according to the formula Y=0.73X+4.4, and the measured threshold values at 500 Hz were measured according to the procedure described with regard to FIG. 4. The dashed line 702 indicates the linearity of the results and the relationship of Y being 0.66X+4.7. These calculated predictions had an $R^2$ value of 0.66. The predicted linear fit 702 is with a statistical significance of $p<0.001$.

Figure 8:
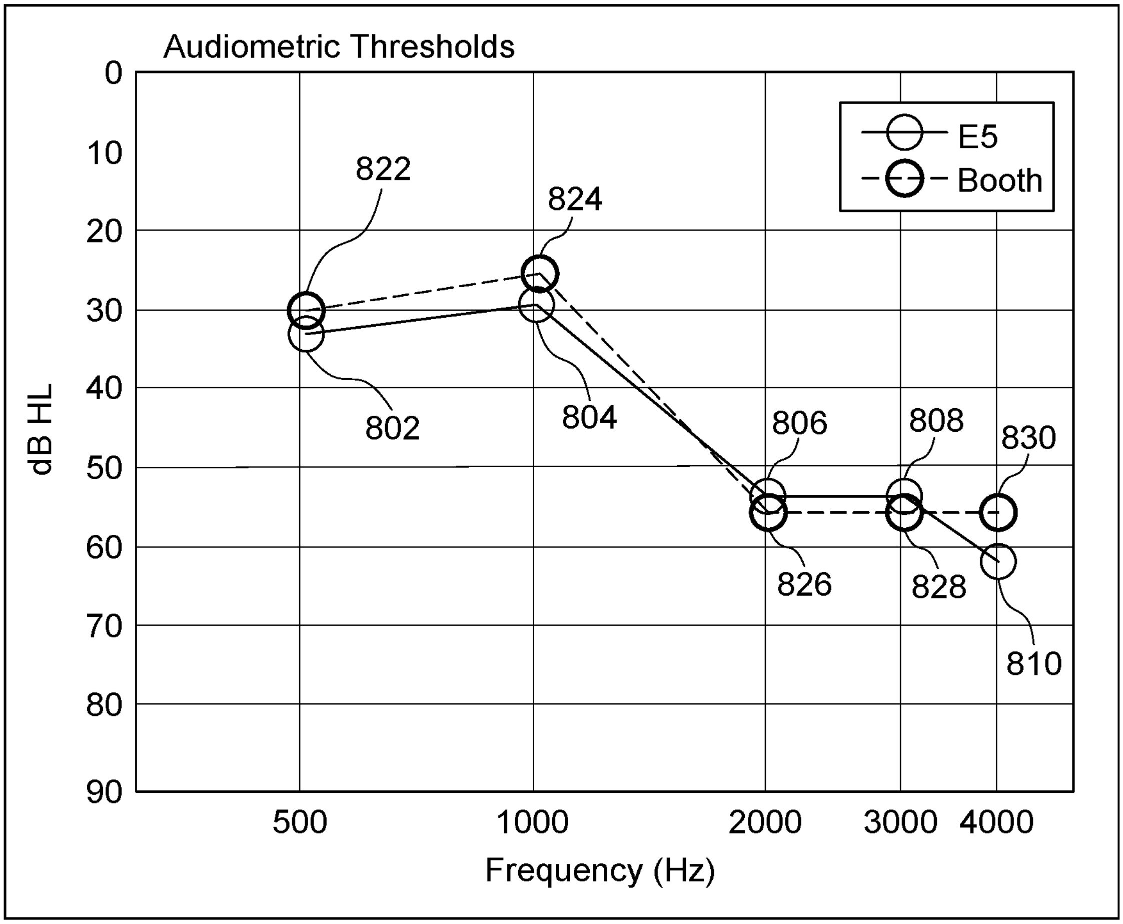
FIG. 8 is a graph showing threshold values measured according to an example of the present invention in comparison with conventional threshold values measured using conventional audiometry procedures.

FIG. 8 graphs the threshold values measured according to an example following the procedure described above with regard to FIG. 4, in comparison with conventional threshold values measured using conventional audiometry procedures for a user with hearing loss. Conventional audiometry procedures involve an audiologist administering hearing screening using pure-tone audiometry in a sound treated booth using calibrated circum-aural headsets. This procedure presents tones in the frequency ranges of 500 Hz to 8 kHz and determines the softest sound a patient can hear at each frequency 50% of the time. As evident from FIG. 8, for this user, the individual thresholds 802, 804, 806, 808 and 810 measured at 500 Hz, 1 kHz, 2 kHz, 3 kHz and 4 kHz, respectively, are each within +/−5 dB of the threshold values 822, 824, 826, 828 and 830 measured at the same respective frequencies by the conventional audiometry procedures.

Upon signal completion, customers will be informed on the classification of their hearing according to the World Health Organization, which includes normal (0-25 dB HL), slight/mild (25-40 dB HL), moderate (41-60 dB HL), severe (61-80 dB HL) and profound (>80 dB HL).

The resulting hearing threshold data is then stored in the mobile device or the cloud or other storage device for use in fitting the hearing device to the user's particular hearing needs.

The output of the hearing assessment serves as the input to a hearing aid fitting algorithm according to an embodiment of the present invention. As noted above, the results of the hearing assessment may produce hearing threshold values at 500, 1000, 2000, 3000, and 4000 Hz ($\theta_{500}$, $\theta_{1000}$, $\theta_{2000}$, θ3000, θ4000, respectively) for one ear, more typically for both right and left ears. These thresholds can be used to select a standardized audiogram e.g., Bisgaard audiogram or a customized audiogram, that best fits the hearing assessment thresholds using metrics described below.

An average hearing threshold level (HTL) can be determined from the hearing assessment results as follows:

$$HTL_{aud} = (HTL_{0.5kHz} + HTL_{1kHz} + HTL_{2kHz} + HTL_{3kHz} + HTL_{4kHz})/5 \tag{2}$$

where $HTL_{aud}$ is the average hearing threshold level;

($HTL_{0.5\ kHz}$ is the hearing threshold level at 500 Hz;

$HTL_{1\ kHz}$ is the hearing threshold level at 1 KHz;

$HTL_{2\ kHz}$ is the hearing threshold level at 2 KHz;

$HTL_{3\ kHz}$ is the hearing threshold level at 3 KHz; and $HTL_{4\ kHz}$) is the hearing threshold level at 4 KHz.

An average audiometric slope per octave ($S_{aud}$) from the hearing assessment results can be calculated as follows:

$$S_{aud} = -[(HTL_{1kHz} - HTL_{0.5kHz}) + (HTL_{2kHz} - HTL_{1kHz}) + (HTL_{4kHz} - HTL_{2kHz}) + (HTL_{3kHz} - HTL_{1.5kHz}) + (HTL_{6kHz} - HTL_{3kHz})]/5 \tag{3}$$

The absolute difference ($d_{htl}$) between the average hearing threshold level ($HTL_{aud}$) and each of the standardized Bisgaard audiograms ($HTL_{bis}$) can then be calculated as follows:

$$d_{htl} = |HTL_{aud} - HTL_{bis}| \tag{4}$$

The absolute difference between the average audiometric slope per octave ($S_{aud}$) and each of the standardized Bisgaard audiograms slope ($S_{bis}$) can also be calculated:

$$d_{slope} = |S_{aud} - S_{bis}| \tag{5}$$

A target score (T) can be calculated as the sum of $d_{htl}$ and $d_{slope}$:

$$T = d_{htl} + d_{slope} \tag{6}$$

The standardized Bisgaard audiogram with the lowest target score T can be selected as the target audiometric response.

Other approaches to selecting a target audiometric response may be implemented. These include, for example, but are not limited to: using a reduced set of audiometric thresholds measured from the listener (as opposed to using all of the measured thresholds), using other signals such as speech in the audiometric assessment (as opposed to pure tones) and/or using the responses to speech to select the target audiometric response.

By choosing thresholds from each ear and assigning them to a hearing loss profile based on the closest standard Bisgaard audiogram, a user can get two different fits for right and left ears although the underlying hearing loss profile may be comparable in the two ears. An unintended consequence of this is that audio signals may sound louder or softer in one ear compared to the other.

In order to address this issue, according to an embodiment of the present invention it is determined if there is a significant asymmetry in hearing between the two ears of the user by comparing individual thresholds for different frequencies across the two ears, e.g., see event 570 in FIG. 5. If the thresholds don't meet asymmetry criteria (based on a predetermined threshold criterion, e.g., 10 dB threshold criterion, but could be set at a different predetermined criterion value), then mean thresholds for each frequency are computed across two ears. That is, if the absolute threshold difference for any measured frequency is less than or equal to the predetermined threshold criterion, then a significant asymmetry does not exist, and therefore mean threshold values are computed. The calculated mean threshold values are mapped to the closest Bisgaard audiogram and both ears are fitted to that audiometric profile at event 572 of FIG. 5. On the other hand, if significant asymmetry is detected by the criterion, then the ears are individually mapped each to the closest Bisgaard audiogram at event 572 of FIG. 5, whereby each is individually fitted to the closest audiometric profile. The process then ends at event 574.

Another issue with in-situ hearing assessment is the occurrence/Measurement of unexpected reduced thresholds at 2 kHz and/or 3 kHz (referred to as a "spike") that may occur. The spike at 2 kHz (and/or 3 kHz) may occur due to incorrect placement of the hearing device in the ear canal and/or due to interactions between the hearing device in the ear-canal, the shape/geometry of the ear-canal and the ear-canal resonance due to which frequencies around 2-3.5 kHz are naturally amplified. Hence, while performing hearing assessment of a hearing device in the ear canal, acoustic tones presented at 2 kHz and/or 3 kHz with a soft input level can be amplified, leading to a lower recorded/measured threshold compared to the "true" threshold that is reflective of the actual hearing loss at these frequencies.

Figure 9A:
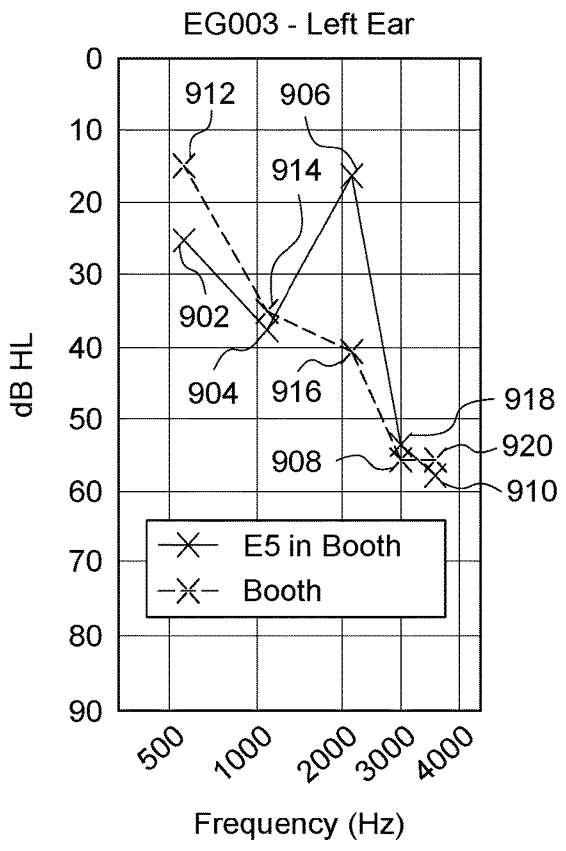
FIG. 9A is a graph showing audiometric threshold values for a left ear measured in a sound booth via a hearing aid in accordance with an embodiment of the present invention, in comparison with conventional threshold values measured using conventional audiometry procedures.

FIG. 9A graphs the threshold values for a left ear measured in a sound booth via a hearing aid (in this instance, an EARGO® 5 hearing aid), which are referred to as "E5 in Booth". Audiometric thresholds were measured in a sound booth with a user using an Eargo 5 hearing aid. The thresholds were measured using Sound Match™ (Eargo, Inc., San Jose, California) technology with the listener wearing Eargo® 5 hearing aid. Sound Match™ is software used to measure audiometric thresholds and to select the appropriate amplification parameters based on the measured thresholds. The audiometric thresholds were measured in the booth by a clinician following audiological best practice methods. The audiologist measured the thresholds with an ANSI calibrated Type I clinical audiometer and insert earphones. The measured audiometric thresholds using the hearing aid in the booth are displayed in comparison with conventional threshold values (referred to as "Booth") measured using conventional audiometry procedures for a user with hearing loss. Conventional audiometry procedures involve an audiologist administering hearing screening using pure-tone audiometry in a sound treated booth using calibrated circum-aural headsets. FIG. 9A shows results for individual thresholds at 500 Hz, 1 kHZ, 2 kHz, 3 KHz and 4 kHz so as to illustrate the "spike" phenomenon. Values 902, 904, 906, 908 and 910 are plotted for individual threshold values measured using the Eargo 5 in the sound booth (E5 in Booth) at frequencies of 500 Hz, 1 kHZ, 2 kHz, 3 KHz and 4 kHz, respectively, and values 912, 914, 916, 918 and 920 are plotted for individual threshold values measured with conventional procedures (Booth) at frequencies of 500 Hz, 1 kHZ, 2 kHz, 3 KHz and 4 kHz, respectively. FIG. 9A shows a spike that occurs in the individual threshold value 906 measured at 2 KHz (2000 Hz) for E5 in Booth compared to the individual threshold value 916 measured at 2 KHz during the conventional (Booth) audiometry procedure.

Figure 9B:
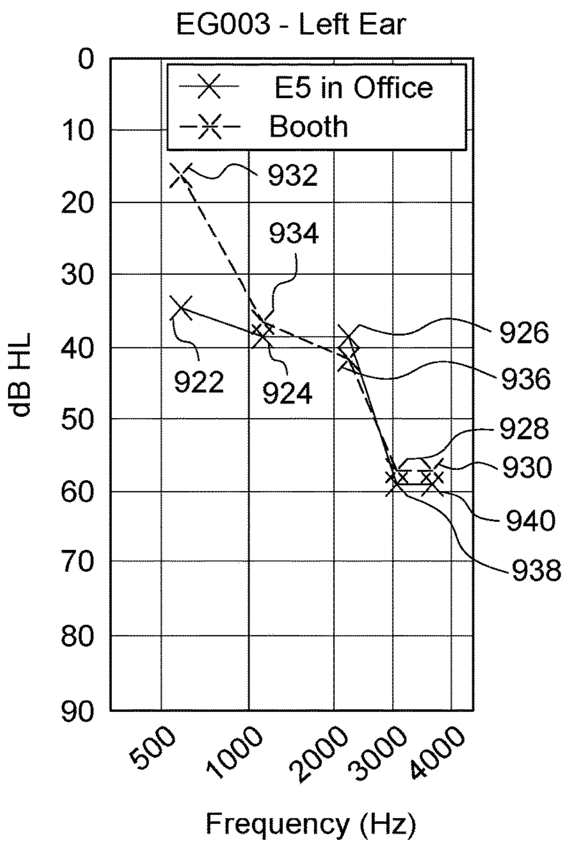
FIG. 9B is another graph showing threshold values for a left ear measured in accordance with an embodiment of the present invention, in comparison with conventional threshold values measured using conventional audiometry procedures.

However, upon re-running the same measurement procedures which were run to achieve the graphed results in FIG. 9A, except the E5 values were measured in an office ("E5 in Office") rather than in an audiometry booth, no spike was measured at 2 KHz, as shown by the results 926 in comparison to 936 in FIG. 9B. Values 922, 924, 926, 928 and 930 are plotted for individual threshold values for E5 in Office at frequencies of 500 Hz, 1 kHZ, 2 kHz, 3 KHz and 4 kHz, respectively, and values 932, 934, 936, 938 and 940 are plotted for individual threshold values for Booth at frequencies of 500 Hz, 1 kHZ, 2 kHz, 3 KHz and 4 kHz, respectively. Thus FIGS. 9A and 9B illustrate the vagaries associated with the occurrences of spikes. In this instance, a spike may have occurred due to incorrect placement of the hearing device as opposed to a true reflection of the threshold at that frequency. For this user, there was a spike occurrence when the thresholds were measured in the booth but no spike was observed when the thresholds were measured again in a different environment (office).

Figure 9C:
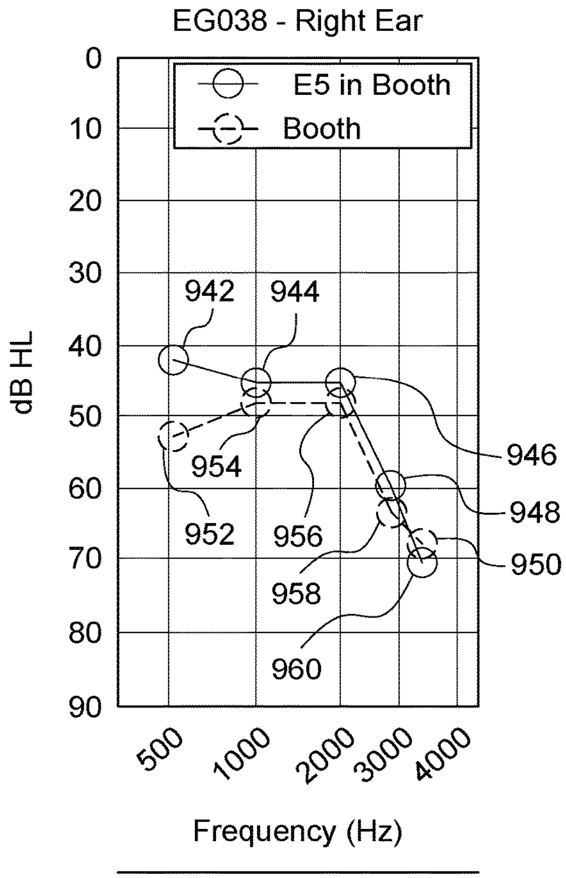
FIG. 9C is a graph showing threshold values for a right ear measured in accordance with an embodiment of the present invention, in comparison with conventional threshold values measured using conventional audiometry procedures.

FIG. 9C graphs the threshold values for a right ear measured using an Eargo 5 hearing aid while the user was in the sound booth (E5 in Booth), in comparison with conventional threshold values measured using conventional audiometry procedures (Booth) for a user with hearing loss. Conventional audiometry procedures involve an audiologist administering hearing screening using pure-tone audiometry in a sound treated booth using calibrated circum-aural headsets. FIG. 9C shows results for individual thresholds at 500 Hz, 1 kHZ, 2 kHz, 3 KHz and 4 kHz so as to illustrate, in comparison, whether the "spike" phenomenon occurs. Values 942, 944, 946, 948 and 950 are plotted for individual threshold values for E5 in Booth at frequencies of 500 Hz, 1 kHZ, 2 kHz, 3 KHz and 4 kHz, respectively, and values 952, 954, 956, 958 and 960 are plotted for individual threshold values for Booth at frequencies of 500 Hz, 1 kHZ, 2 kHz, 3 KHz and 4 kHz, respectively. FIG. 9C does not show the occurrence of a significant spike that occurs when comparing the individual threshold values between E5 in Booth and Booth audiometry procedures.

Figure 9D:
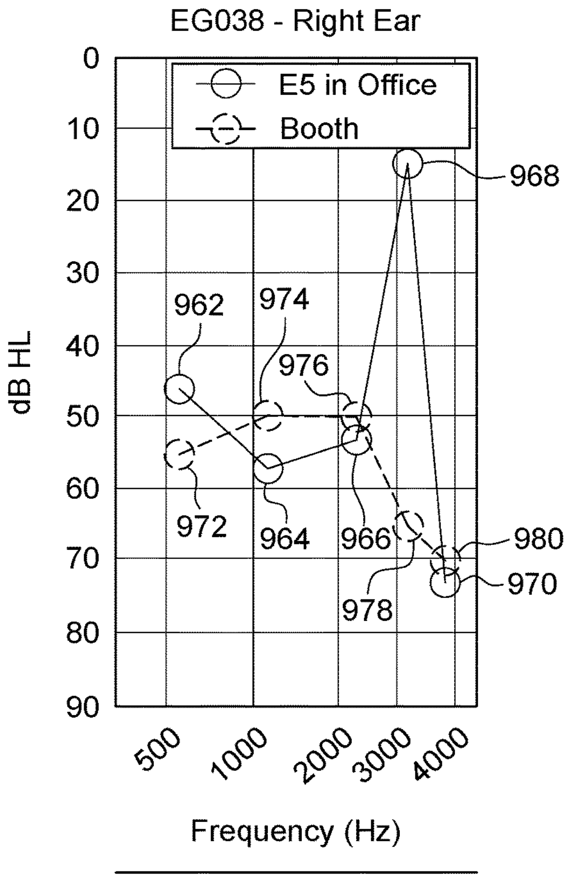
FIG. 9D is another graph showing threshold values for a right ear measured in accordance with an embodiment of the present invention, in comparison with conventional threshold values measured using conventional audiometry procedures.

However, upon re-running the same measurement procedures which were run to achieve the graphed results in FIG. 9C, but where E5 measurements were taken in an office (E5 in Office) rather than in an audiometry booth (E5 in Booth), a spike was measured at 3 Khz, as shown by the results 968 in comparison to 978 in FIG. 9D. Values 962, 964, 966, 968 and 970 are plotted for individual threshold values for E5 in Office at frequencies of 500 Hz, 1 kHZ, 2 kHz, 3 KHz and 4 kHz, respectively, and values 972, 974, 976, 978 and 980 are plotted for individual threshold values for Booth at frequencies of 500 Hz, 1 kHZ, 2 kHz, 3 KHz and 4 kHz, respectively. This illustrates the vagaries during which a spike may or may not show up during testing.

In some scenarios, the lowered thresholds can be the "true" thresholds based on the actual ear canal shape and resonance properties of the individual. However, in most cases, the lowered threshold can be corrected by adjusting or repositioning the device in the ear-canal before performing hearing assessment with hearing assessment software such as Sound Match™ or other hearing assessment software that can be used for assessment and fitting of hearing instruments. The occurrence of such spikes at 2 kHz and/or 3 kHz can lead to incorrect hearing instrument fitting (based on the measured hearing thresholds), incorrect assignment/interpretation of hearing loss asymmetries across the two ears (leading to sound being louder in one ear compared to the other ear due to incorrect fitting) and possibly other sound quality issues.

Since the occurrence of a spike cannot currently be predicted prior to actually measuring its occurrence, and given the expectations for the time requirements to complete audiometric testing (preferably less than 5 minutes), the present invention provides a smoothing process to detect and correct obvious spikes upon completion of audiometric testing. In at least one embodiment, detection and correction of obvious spikes at 2 kHz and/or 3 kHz are performed. However, this procedure could be modified to detect and correct obvious spikes at one or more other predetermined frequencies, as would be apparent to one of ordinary skill in the art after reading the present disclosure.

Figure 10:
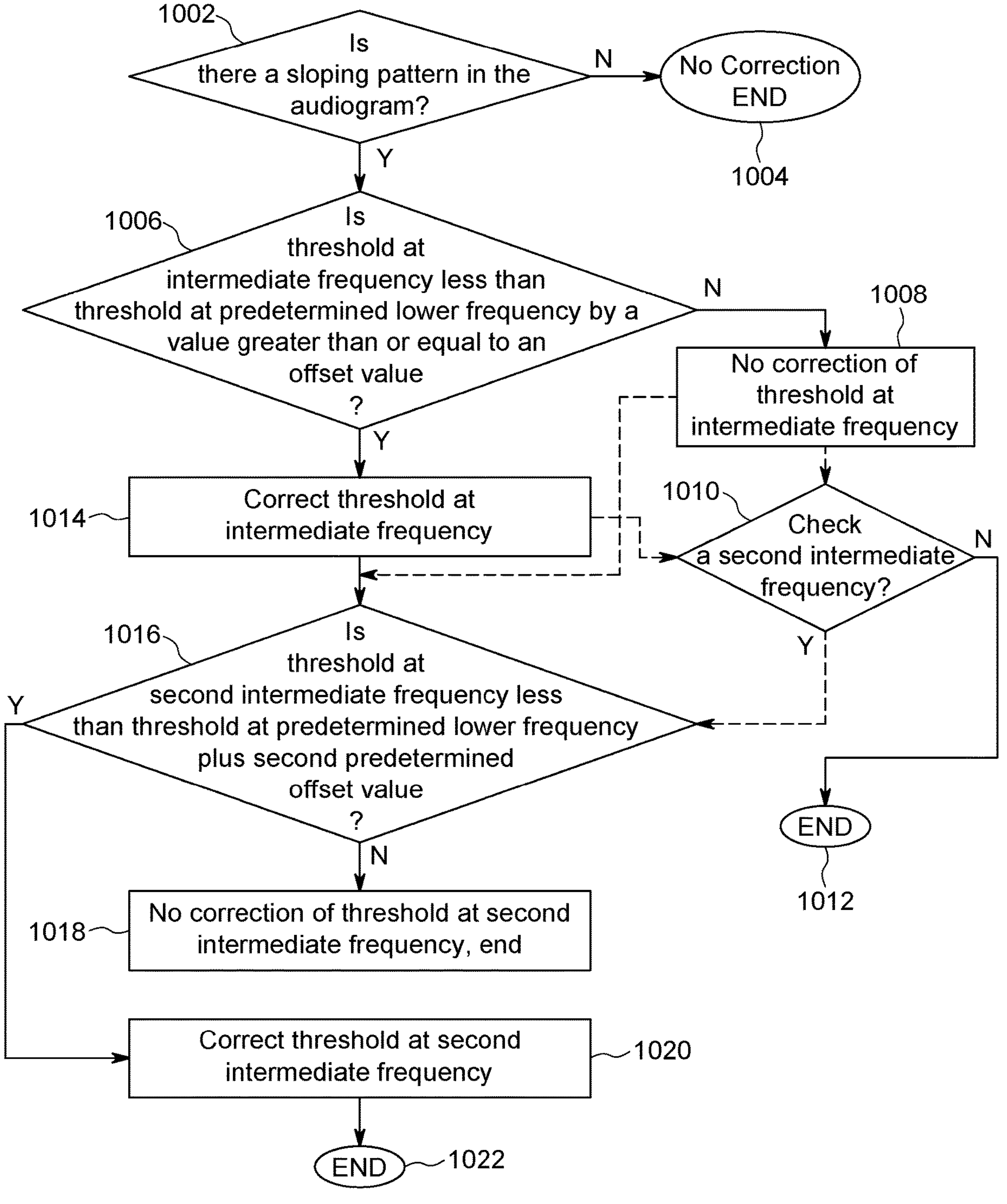
FIG. 10 is a flowchart illustrating events that may be carried out in a process for detection and correction of obvious spikes in one or more measured individual threshold values, according to an embodiment of the present invention.

FIG. 10 is a flowchart illustrating events that may be carried out in a process for detection and correction of obvious spikes in one or more measured individual threshold values, according to an embodiment of the present invention. At event 1002, a determination is made as to whether there is a sloping pattern in an audiogram resulting from measurements of individual threshold levels taken at predefined frequencies in a manner as described above. One method of making such a determination is to compare the individual threshold level measured at a predefined higher frequency with an individual threshold level measured at a predefined, relatively lower frequency. If the level at the higher frequency is greater than or equal to the level at the relatively lower frequency, then it is determined that the audiogram has a sloping pattern. If the level at the higher frequency is less than the level at the lower frequency, it is determined that the audiogram does not have a sloping pattern and no corrections are performed, so the processing ends at event 1004. In at least one embodiment, the higher level is the level measured at 4 KHz and the lower level is the level measured at 1 KHz. However, the frequencies for these predefined higher and lower levels could be different and the process could still be performed.

In instances when it is determined at event 1002 that there is a sloping pattern in the audiogram, processing then proceeds to event 1006 where an individual threshold level measured at a frequency intermediate of the level at the higher frequency and level at the lower frequency is compared with the level at the lower frequency, in at least one embodiment, the intermediate level is the level measured at 2 KHz. However, the predefined frequency at which the intermediate level is measured could be some other predefined frequency intermediate of the predefined higher and lower frequencies.

If the threshold level at the intermediate frequency is less than the threshold level at the lower frequency by an amount greater than or equal to a predetermined offset value, then the intermediate threshold value is corrected or adjusted at event 1014. In at least one embodiment, the predetermined offset value is 5 dB, but values less than or greater than this value could be substituted. In at least one embodiment, the correction of the threshold level at the intermediate frequency is by adding a level equal to the predetermined offset value. Alternatively, a value less than or greater than the predetermined offset value could be added as the correction.

If the threshold level at the intermediate frequency is not less than the threshold level at the lower frequency by an amount greater than or equal to a predetermined offset value, then the intermediate threshold value is not corrected at event 1008.

After either event 1008 or 1014, it is determined at event 1010 whether to check a second intermediate frequency for spiking. Alternatively, processing may be configured to automatically check for the spiking at the second intermediate frequency at event 1016. If it is determined at event 1010 that no check for a spike at a second intermediate frequency is to be performed, then processing ends at event 1012. If, on the other hand is it determined at event 1010 that a check for a spike at a second intermediate frequency is to be performed (or in alternate embodiments processing automatically proceeds from event 1014 to event 1016), then, at event 1016 it is determined whether an individual threshold level measured at a second intermediate frequency less than the higher frequency but greater than the intermediate frequency considered at event 1006. In at least one embodiment, the second intermediate level is the level measured at 3 KHz. However, the predefined frequency at which the second intermediate level is measured could be some other predefined frequency intermediate of the predefined higher and intermediate frequencies.

At event 1016 the individual threshold level measured at the second intermediate frequency is less than the threshold level at the lower frequency by an amount greater than or equal to a second predetermined offset value, then the second intermediate threshold value is corrected or adjusted at event 1020. Processing then ends at event 1022. In at least one embodiment, the second predetermined offset value is equal to the (first) predetermined offset value used in event 1006. Alternatively, the first and second predetermined offset values could be unequal. In at least one embodiment, the correction of the threshold level at the second intermediate frequency is made by adding a level equal to the second predetermined offset value. Alternatively, a value less than or greater than the second predetermined offset value could be added as the correction.

If the threshold level at the second intermediate frequency is not less than the threshold level at the lower frequency by an amount greater than or equal to the second predetermined offset value, then the second intermediate threshold value is not corrected and processing ends at event 1018.

As one non-limiting embodiment, at event 1002, it can be determined whether there is a sloping pattern in an audiogram by determining whether the individual threshold level measured at 4 KHz frequency is greater than or equal to the individual threshold level at measured at 1 KHz. If yes, then it is determined that there is a sloping pattern and at event 1006 it is determined whether an individual threshold level measured at an intermediate frequency of 2 KHz is less than the individual threshold level measured at 1 KHz by at least 5 dB. If the individual threshold level measured at 2 KHz is less than the individual threshold level measured at 1 KHz by 5 dB or more, then the individual threshold level for the 2 KHz frequency is adjusted/corrected at event 1014 by adding 5 dB to the measured value. Whether or not the correction has been made (events 1014, 1008) in this embodiment, the processing automatically proceeds to event 1016. At event 1016, it is determined whether an individual threshold level measured at a second intermediate frequency of 3 KHz is less than the individual threshold level measured at 1 KHz by at least 5 dB. If the individual threshold level measured at 3 KHz is less than the individual threshold level measured at 1 KHz by 5 dB or more, then the individual threshold level for the 3 KHz frequency is adjusted/corrected at event 1020 by setting it equal to the measured or corrected individual threshold level for 2 KHz.

Figure 11A:
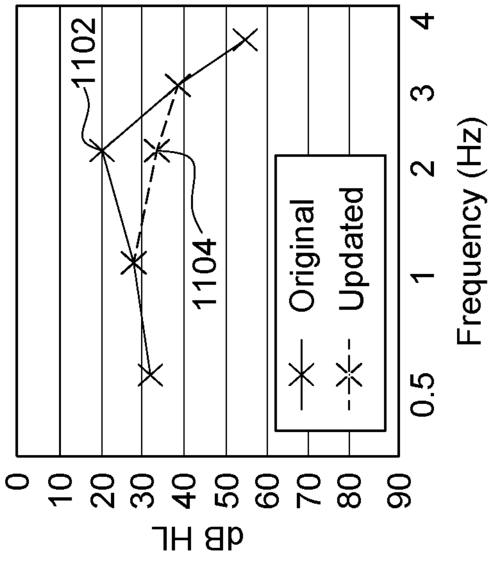
FIGS. 11A-11F show results of audiograms that were modified after processing for detecting and correcting spikes according to an embodiment of the present invention.
Figure 11B:
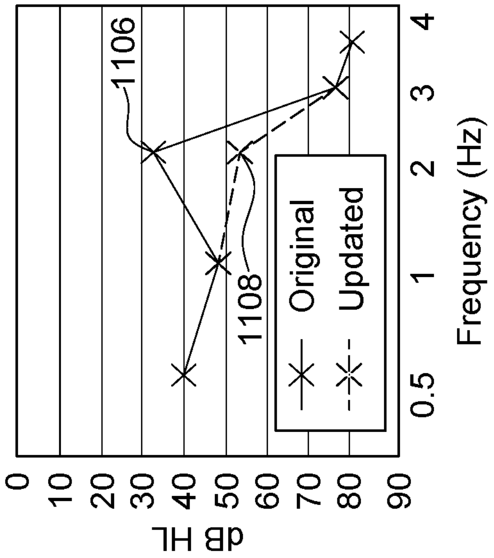
Figure 11C:
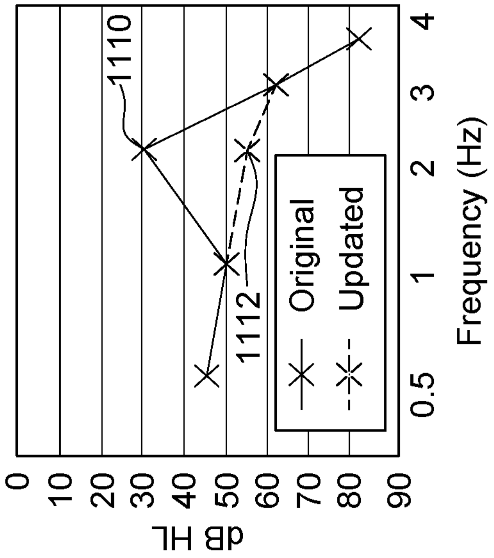
Figure 11F:
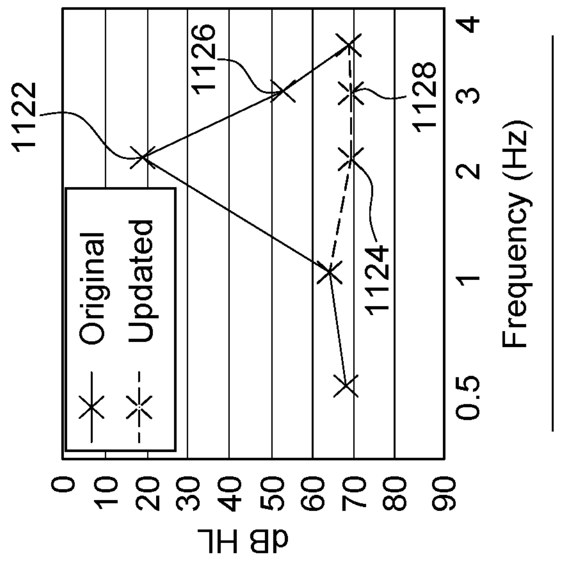
Figure 11E:
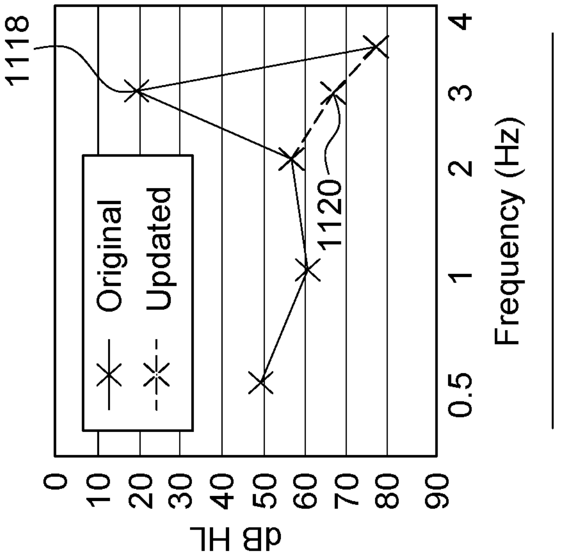
Figure 11D:
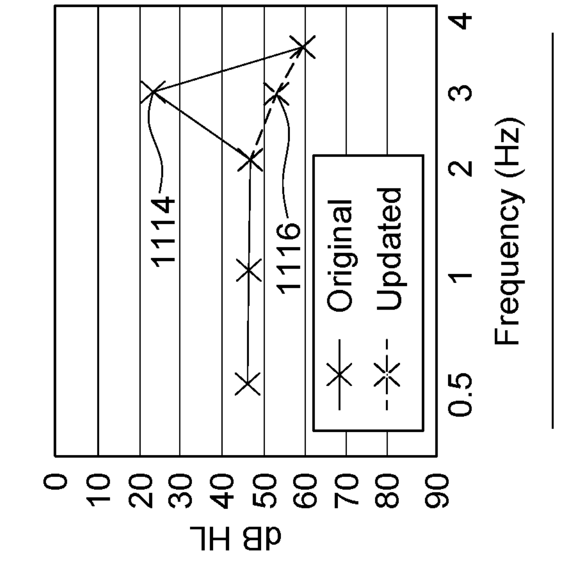

FIGS. 11A-11F show results of audiograms that were modified after processing with the non-limiting embodiment for detecting and correcting spikes described above. In FIG. 11A, it can be seen that the individual threshold value at the intermediate frequency of 2 KHz has been corrected from the measured value 1102 to the corrected value. Likewise, the spiked value 1106 measured at 2 KHz in FIG. 11B has been corrected to the value at 1108. In FIG. 11C, the spiked value 1106 measured at 2 KHz has been corrected to the value at 1112. In FIG. 11D, the spiked value 1114 measured at 3 KHz has been corrected to the value at 1116. In FIG. 11E the spiked value 1118 measured at 3 KHz has been corrected to the value at 1120. In FIG. 11F the spiked value 1122 measured at 2 KHz has been corrected to the value at 1124 and the value 1126 measure at 3 KHz has been corrected to the value at 1128.

Bisgaard Audiograms

Bisgaard audiograms represent a set of 60 standard audiograms at 250, 500, 1000, 1500, 2000, 3000, 4000 and 6000 Hz that cover the entire range of audiograms encountered in clinical practice. This set of standard audiograms has been derived by a vector quantization analysis method on a database of 28,244 audiograms. This approach to characterizing hearing threshold for an entire population is attractive because it is a way to limit the number of programming outcomes into a manageable subset of hearing loss profiles. In addition, for preference-based fitting algorithms, the use of Bisgaard audiograms lends to the possibility of alternative audiograms for subsequent user-preferred insertion gain prescriptions. This allows for user-initiated deviation from the rigid insertion gain targets prescribed by the NAL-R algorithm, i.e., paves the way for the user to fine tune their own hearing devices similar to what an audiologist would perform.

Of the 60 standard Bisgaard audiograms, all of them may or may not be used. Additionally, those 60 audiograms may be further customized to cater to the capabilities of specific hearing devices or specific hearing loss profiles. Thus, even though the origination is a standardized Bisgaard audiogram; further customization at one or many frequencies may be applied. Further; certain Bisgaard audiograms that may fall outside of the fitting range may be assigned to one or more factory profiles that are shipped along with a hearing device. As noted above, the results of the hearing assessment metrics can used to find the Bisgaard audiogram with the nearest average threshold and average slope; checked for asymmetric logic and assigned to each ear.

Bisgaard Audiogram Design

Each of the Bisgaard audiograms (standardized and/or customized) can be created by calculating insertion gains using NAL-R fitting formula for hearing threshold at 250, 500, 1000, 2000, 3000, 4000 & 6000 Hz and saved in hearing device memory (e.g., firmware memory).

NAL-R is a linear fitting formula and is meant to be applied to hearing devices which function as linear devices, i.e. no compression is applied at any levels except at a very high level in the form of output limiting. However, for this embodiment and for gain customization; insertion gains can be computed and applied to a linear region and there may be a compression region associated with the hearing device as well. NAL-R formulae that can be used to calculate insertion gains are as follows:

$$H_{3FA} = (H_{500} + H_{1k} + H_{2k})/3 \tag{7}$$

$$X = 0.15 * H_{3FA} \tag{8}$$

$$IG_i = X + 0.31 * H_i + k_i \tag{9}$$

| Freq (Hz) | 250 | 500 | 1k | 2K | 3k | 4K | 6k |
|---|---|---|---|---|---|---|---|
| Ki (dB) | -17 | -8 | 1 | -1 | -2 | -2 | -2 |

where:

$H_{3FA}$ is the average of the hearing threshold levels at 500 Hz, 1 KHz and 2 KHz;

$H_{500}$ is the hearing threshold level at 500 Hz;

$H_{1k}$ is the hearing threshold level at 1 KHz;

$H_{2k}$ is the hearing threshold level at 2 KHz;

X is a constant used in computation of insertion gain for the NAL-R fitting formula;

IG is insertion gain; and $k_i$ is gain in dB at the $i^{th}$ frequency; and $H_i$ is the hearing threshold level at the $i^{th}$ frequency.

For every Bisgaard audiogram; which is given in terms of hearing threshold levels; corresponding insertion gains are calculated by the above formula. The goal is to match the insertion gain targets for each of the customized Bisgaard audiograms. An example of this is shown below. This is achieved by using the multi-channel Wide Dynamic Range Compression (WDRC) architecture. In other words, digital gains and threshold parameters of WDRC architecture are adjusted to customize each Bisgaard audiogram.

Wide Dynamic Range Compression (WDRC) refers to a type of compression scheme utilized in hearing devices primarily to decrease the range of sound levels in the environment to better match the dynamic range of a hearing impaired person. In order to obtain a customized gain prescription; various parameters of WDRC algorithm are adjusted across all channels of WDRC.

Figure 12:
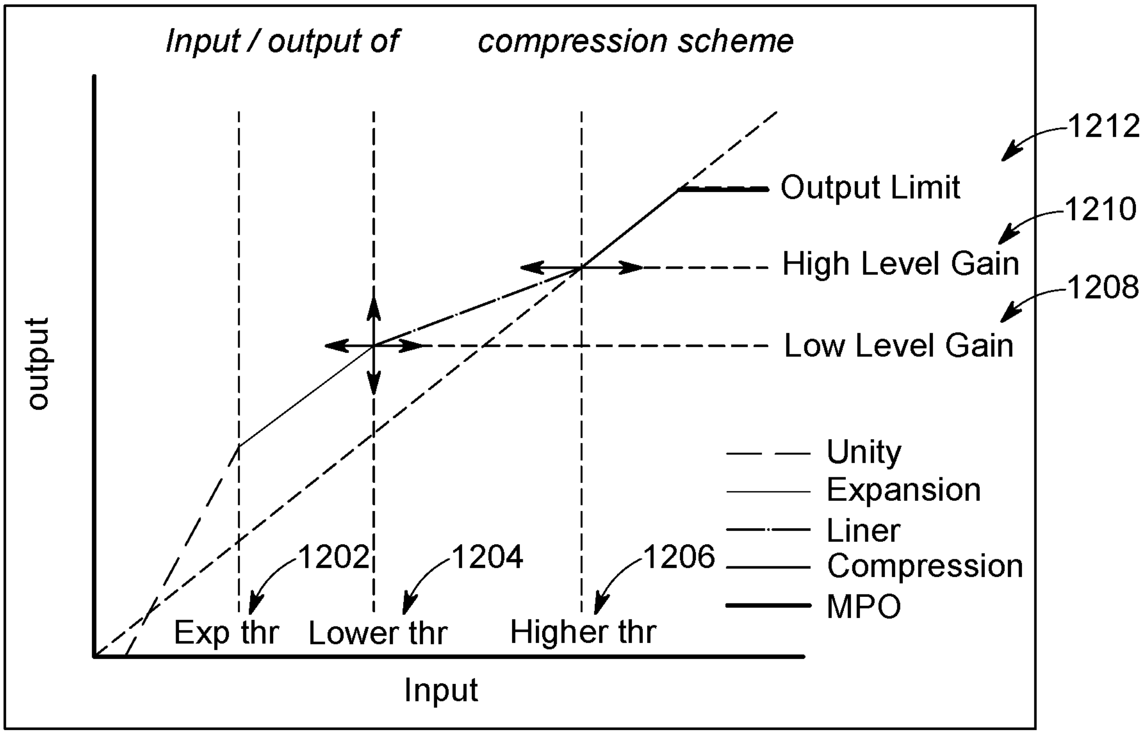
FIG. 12 shows an exemplary graph of a typical input/output function of a hearing device.

FIG. 12 shows an exemplary graph of a typical input/output function of a hearing device. Parameters of WDRC such as expansion threshold 1202, low level threshold 1204, high level threshold 1206, low level gain 1208, high level gain 1210 and Output limit 1212 can be adjusted to obtain a customized fitting audiogram.

Figure 13:
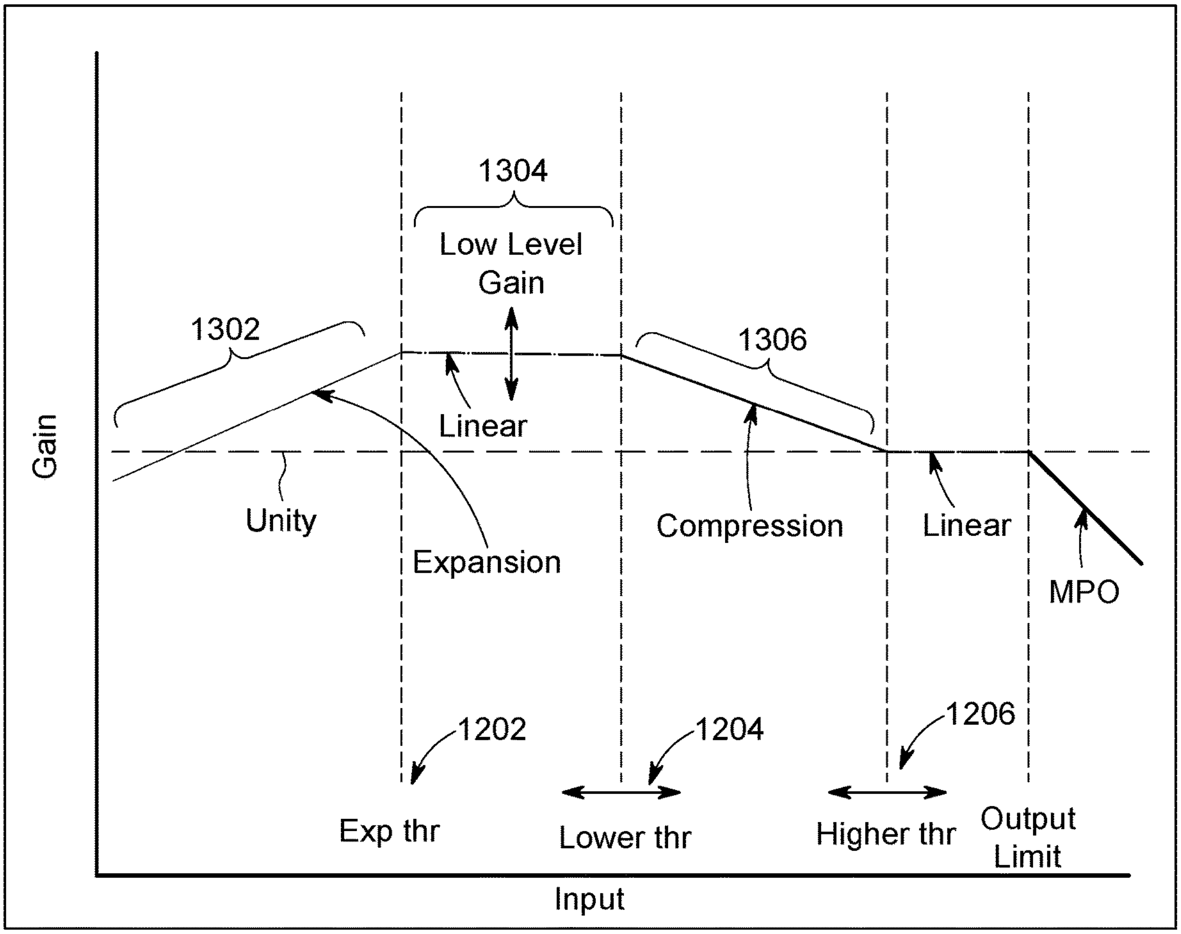
FIG. 13 shows a graph of a complementary Input/Gain function of the hearing device corresponding to the input/output function shown in FIG. 9.

FIG. 13 shows a graph of a complementary Input/Gain function of the hearing device corresponding to the input/output function graphed in FIG. 12. The region 1302 before and up to the expansion threshold is characterized by expansion, i.e. the hearing device is in expansion. The main purpose of expansion is to reduce low level noises such as microphone circuit noise. Expansion kicks in at below expansion threshold and reduces the gain of hearing device and hence facilitates the reduction of annoying low level circuit noise, making it less audible.

The region 1304 between the expansion threshold 1202 and the low level threshold 1204 is characterized as a linear region. In region 1304, the gain function of the hearing device responds linearly to the input. Customized audiograms can be created by adjusting WDRC digital gains (e.g., low level gains 1208) to match the insertion gain prescribed according to the NAL-R linear fitting formula. The region 1306 between low level threshold 1204 and the high level threshold 1206 is characterized by compression. In region 1306, the hearing device functions in compression. High level gain 1210 controls the compression ratio. The loudness discomfort level (LDL) can be set to one standard deviation below the mean LDL data reported by Pascoe and as shown in Table 4 below, see also: Pascoe D. P.: "Clinical measurement of the auditory dynamic range and their relation to formulas for hearing aid gain" (1988) in Jensen JH (ed). *Hearing Aid Fitting*. Copenhagen: Storgaard Jensen, 129-154, which are incorporated herein, in their entireties, by reference thereto. Loudness discomfort level is the level of the input signal that a subject may deem as being too loud causing hearing discomfort. Although the sound level that causes discomfort may vary from person to person, typically, this value is set based on an approximation from the data collected from several users in the field. The high level threshold 1206 is set to match the LDL. If the LDL is higher than the output limit 1212, the higher threshold 1206 is set to match the output limit 1212. The output limit 1212 of each channel is set in a way to limit non-linear distortion of hearing devices. Each channel is x frequencies wide. In one non-limiting example, Channel-1 may range from 0 Hz-375 Hz, Channel-2 from 375 Hz-625 Hz, Channel-3 from 625 Hz-1125 Hz, Channel-4 from 1125 Hz-1625 Hz, Channel-5 from 1625 Hz-2375 Hz, Channel-6 from 2375 Hz-3375 Hz, and Channel-7 from 3375 Hz-5375 and Channel-8 from 5375 Hz-8000 Hz, etc. However, the frequency ranges may be set to any desired interval. Also, channels do not necessarily need to each be of equal size ranges. For example, if eight channels are defined (Channels 1 through 8), Channel 1 could be larger than Channel 2 (e.g., 375 Hz bandwidth vs. 350 Hz bandwidth), or could be defined as desired. Any channel can have a predefined bandwidth that is equal to, larger than or smaller than the bandwidth of those described in the example above. Further any channel can have a bandwidth that is equal to, less than or greater than the bandwidth of another channel. Also the total number of channels may be equal to, less than or greater than eight.

TABLE 4

Mean, standard deviation (SD), and number of data points (N), for LDL at four frequencies (in dB SPL) measured by Pascoe (1988). Also provided are minimum, maximum, range at each frequency and grand mean, SD, and N.

| | 500 Hz | | | 1000 Hz | | | 2000 Hz | | |
|---|---|---|---|---|---|---|---|---|---|
| HL | Mean | SD | N | Mean | SD | N | Mean | SD | N |
| 0 | 107.4 | 9.9 | 14 | 110.7 | 6.8 | 6 | — | — | — |
| 5 | 109.7 | 8.7 | 22 | 110.3 | 6.4 | 12 | — | — | — |
| 10 | 111.1 | 7.3 | 39 | 109.3 | 6.9 | 15 | 125.0 | — | 1 |
| 15 | 109.5 | 6.8 | 57 | 108.1 | 6.5 | 32 | 115.0 | — | 1 |
| 20 | 107.0 | 7.8 | 45 | 109.0 | 7.1 | 20 | 110.0 | 2.9 | 2 |
| 25 | 112.4 | 8.9 | 40 | 111.4 | 8.5 | 40 | 115.0 | 9.6 | 5 |
| 30 | 114.5 | 8.4 | 54 | 109.8 | 8.1 | 40 | 115.5 | 9.1 | 11 |
| 35 | 109.9 | 8.7 | 57 | 112.3 | 7.4 | 51 | 118.3 | 7.3 | 24 |
| 40 | 112.2 | 9.7 | 45 | 111.1 | 9.5 | 63 | 119.6 | 9.0 | 52 |
| 45 | 118.6 | 9.5 | 32 | 113.2 | 8.9 | 63 | 120.6 | 8.9 | 63 |
| 50 | 117.3 | 9.8 | 33 | 117.2 | 9.2 | 47 | 122.7 | 9.1 | 84 |
| 55 | 118.7 | 8.5 | 27 | 117.4 | 7.8 | 44 | 122.6 | 8.3 | 82 |
| 60 | 120.2 | 6.1 | 17 | 117.3 | 6.5 | 26 | 125.6 | 7.1 | 78 |
| 65 | 120.3 | 7.6 | 6 | 121.0 | 6.8 | 22 | 130.2 | 8.0 | 30 |
| 70 | 115.8 | 4.8 | 4 | 123.3 | 6.7 | 7 | 130.5 | 8.4 | 22 |
| 75 | 128.3 | 6.4 | 8 | 131.5 | 10.6 | 2 | 131.9 | 7.2 | 24 |
| 80 | 127.0 | 5.8 | 4 | 129.0 | 10.0 | 3 | 134.7 | 4.6 | 16 |
| 85 | 137.0 | — | 1 | 126.5 | 4.2 | 6 | 135.7 | 6.7 | 7 |
| 90 | 142.0 | — | 1 | 136.5 | 3.5 | 2 | 135.0 | — | 1 |
| 95 | 132.0 | — | 1 | — | — | — | — | — | — |
| 100 | — | — | — | — | — | — | — | — | — |
| 105 | — | — | — | — | — | — | 150.0 | 7.1 | 2 |
| 110 | — | — | — | 144.0 | — | 1 | 151.7 | 2.9 | 3 |
| 115 | — | — | — | — | — | — | — | — | — |
| 120 | — | — | — | — | — | — | — | — | — |
| GRAND | 118.5 | 1.5 | 507 | 118.5 | 1.8 | 508 | 126.8 | 2.1 | 508 |
| Minimum | 107 | | | 106 | | | 110 | | |
| Maximum | 142 | | | 144 | | | 152 | | |
| Range | 35 | | | 36 | | | 42 | | |

| | 4000 Hz | | | Grand | Grand | Grand |
|---|---|---|---|---|---|---|
| HL | Mean | SD | N | Mean | SD | N |
| 0 | — | — | — | 109.1 | 8.4 | 20 |
| 5 | — | — | — | 110.0 | 8.1 | 34 |
| 10 | 103.0 | — | 1 | 112.1 | 7.3 | 56 |
| 15 | 113.0 | — | 1 | 111.4 | 6.7 | 91 |
| 20 | 104.7 | 2.9 | 3 | 107.7 | 7.7 | 76 |
| 25 | 113.0 | 0.0 | 2 | 113.0 | 8.6 | 87 |
| 30 | 119.7 | 12.6 | 3 | 114.9 | 8.4 | 108 |
| 35 | 123.0 | — | 1 | 115.9 | 8.4 | 133 |
| 40 | 118.0 | 7.1 | 15 | 115.2 | 9.3 | 175 |
| 45 | 119.3 | 11.4 | 19 | 117.9 | 9.3 | 177 |
| 50 | 120.8 | 10.2 | 34 | 119.5 | 9.4 | 198 |
| 55 | 120.8 | 8.9 | 66 | 119.9 | 8.4 | 219 |
| 60 | 123.3 | 8.4 | 67 | 121.6 | 7.5 | 188 |
| 65 | 126.9 | 9.3 | 58 | 124.8 | 8.5 | 110 |
| 70 | 128.4 | 7.7 | 61 | 124.5 | 8.0 | 94 |

TABLE 4-continued

Mean, standard deviation (SD), and number of data points (N), for LDL at four frequencies (in dB SPL) measured by Pascoe (1988). Also provided are minimum, maximum, range at each frequency and grand mean, SD, and N.

| | | | | | | |
|---|---|---|---|---|---|---|
| 75 | 129.6 | 5.7 | 57 | 130.3 | 6.2 | 91 |
| 80 | 133.5 | 6.0 | 33 | 131.1 | 5.9 | 56 |
| 85 | 133.2 | 6.5 | 22 | 133.1 | 6.1 | 36 |
| 90 | 136.3 | 5.6 | 26 | 137.5 | 5.6 | 30 |
| 95 | 143.5 | 7.2 | 10 | 137.8 | 7.6 | 11 |
| 100 | 139.6 | 6.3 | 16 | 139.6 | 6.3 | 16 |
| 105 | 145.5 | 4.2 | 6 | 147.8 | 4.6 | 8 |
| 110 | 144.7 | 7.6 | 3 | 146.8 | 5.4 | 7 |
| 115 | 149.7 | 5.8 | 3 | 149.7 | 5.8 | 3 |
| 120 | 153.0 | — | 1 | 153.0 | — | 1 |
| GRAND | 127.9 | 2.9 | 508 | | | 2031 |
| Minimum | 103 | | | | | |
| Maximum | 153 | | | | | |
| Range | 50 | | | | | |

Example Bisgaard Audiogram Procedure

As mentioned above, each of the Bisgaard audiograms can be pre-created; saved into the hearing device memory and assigned based on the fitting algorithm logic above. Below is a step-by-step process of how one such Bisgaard audiogram (Bisgaard #5 in this case) was created. Similar procedure applies to creation of any customized audiogram.

Bisgaard Audiogram #5 has audiometric hearing thresholds as below:

Example Audiometric Hearing Threshold

| Frequency (Hz) | Hearing Threshold (dBHL) |
|---|---|
| 250 | 10 |
| 500 | 10 |
| 1000 | 10 |
| 1500 | 10 |
| 2000 | 10 |
| 3000 | 20 |
| 4000 | 35 |
| 6000 | 40 |

Real Ear Insertion Gain (REIG) was calculated using NAL-R fitting formulae (equations (7)-(9) above); which take the audiometric threshold as input and output insertion gain as shown below. This was the target insertion gain calculated to meet the hearing threshold associated with audiogram #5 and includes the gains that the hearing device was to be programmed with in this example when using Bisgaard audiogram #5: Real Ear Insertion Gain (REIG) calculated from Hearing threshold

| Frequency (Hz) | Insertion Gain (dB) |
|---|---|
| 250 | −12.4 |
| 500 | −3.4 |
| 1000 | 5.6 |
| 1500 | 5.6 |
| 2000 | 3.6 |
| 3000 | 5.7 |
| 4000 | 10.35 |
| 6000 | 11.90. |

The target insertion gain was set in the hearing aid by tuning the digital gains of multi-channel WDRC. These were tuned in standardized couplers such as a 2 cc (IEC-60318-5), 0.4 cc (IEC TS62886) or 711 (IEC-60318-4) coupler. Hence a transform from REIG to a coupler gain needs to be applied. The prescribed insertion gain for each audiogram can be converted into coupler gain using a formula called "CORFIG" (Coupler response for flat insertion gain):

$$REIG = Coupler\ \text{gain} - CORFIG \tag{10}$$

$$CORFIG = REUG - RECD + MLE \tag{11}$$

where

REIG is real ear insertion gain, in dB;

REUG is real ear unaided gain, in dB;

RECD is real ear to coupler difference, in dB; and

MLE is microphone location effect, in dB.

For tuning gains to the hearing aid, a standardized 0.4 cc coupler was used. However, the same gains can be programed with a standardized 2 cc coupler or 711 coupler. Appropriate transforms need to be applied.

The values that were used to determine CORFIG were extracted from Audioscan Verifit test system's manual and are as follows:

Coupler Transforms: CORFIG

| Frequency | RECD | MLE | REUG | CORFIG = REUG − RECD + MLE |
|---|---|---|---|---|
| 250 | −9.00 | 1.30 | 1.00 | 11.30 |
| 500 | −8.00 | 1.30 | 2.00 | 11.30 |
| 1000 | −3.00 | −0.40 | 3.00 | 5.60 |
| 1500 | −3.00 | 4.20 | 5.00 | 12.20 |
| 2000 | −2.00 | 8.10 | 12.00 | 22.10 |
| 3000 | −3.00 | 5.70 | 15.00 | 23.70 |
| 4000 | 0.00 | 8.60 | 14.00 | 22.60 |
| 6000 | 4.00 | 9.00 | 7.00 | 12.00. |

For Bisgaard audiogram #5; the target REIG based on the NAL-R fitting formulae (7)-(9) was calculated.

The hearing aid digital gains in the coupler were programmed to meet the desired REIG per the formula for REIG defined above.

Figure 14B:
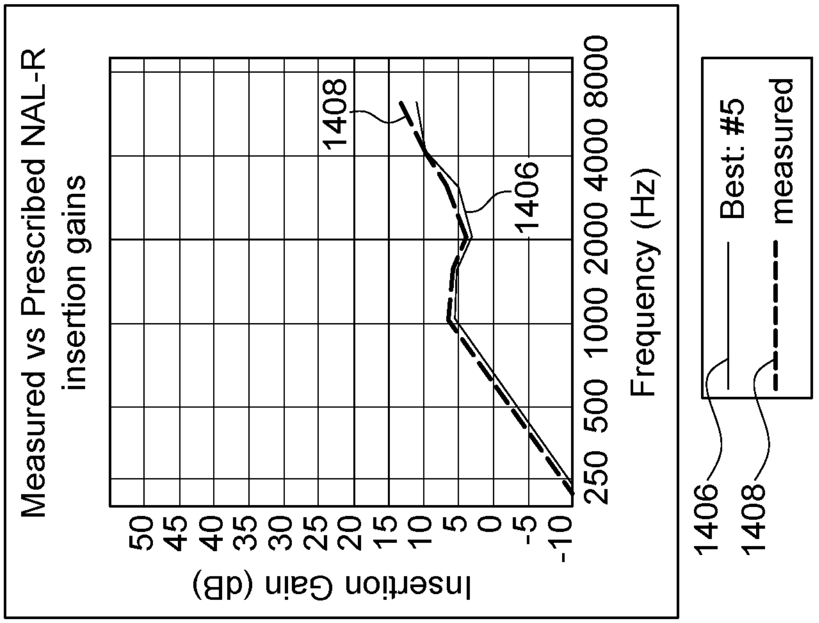
FIG. 14B shows the prescribed NAL-R insertion gain versus what was measured in the coupler and programmed into the hearing aids in the example referred to in FIG. 14A.
Figure 14A:
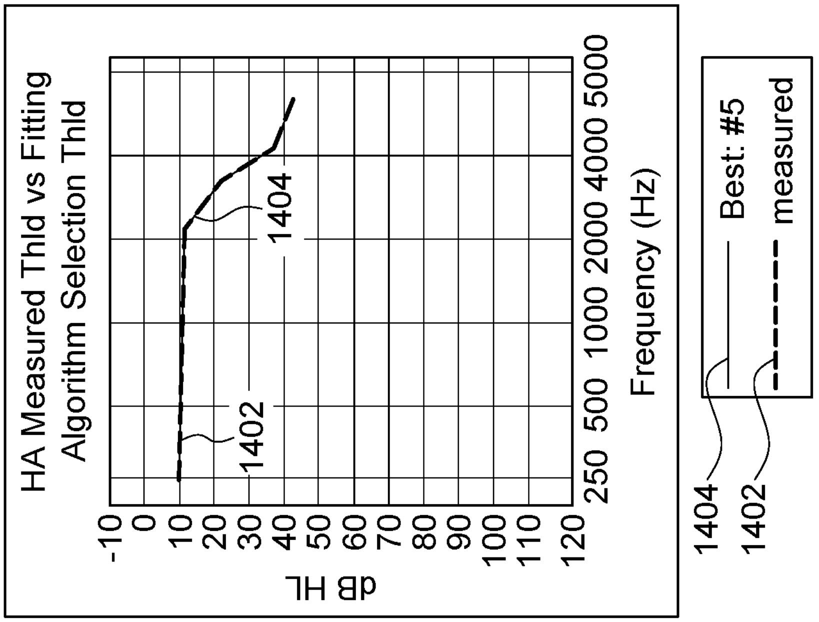
FIG. 14A shows an example hearing assessment measured threshold and the corresponding fitting Bisgaard audiogram selected according to an example of an embodiment of the present invention.

FIG. 14A shows an example hearing assessment measured threshold 1402 and the corresponding fitting Bisgaard audiogram 1404 selected according to the example described above, which was Bisgaard audiogram #5 in this case. FIG. 14B shows the prescribed NAL-R insertion gain 1406 versus what was measured 1408 in the coupler and programmed into the hearing aids.

Figure 15A:
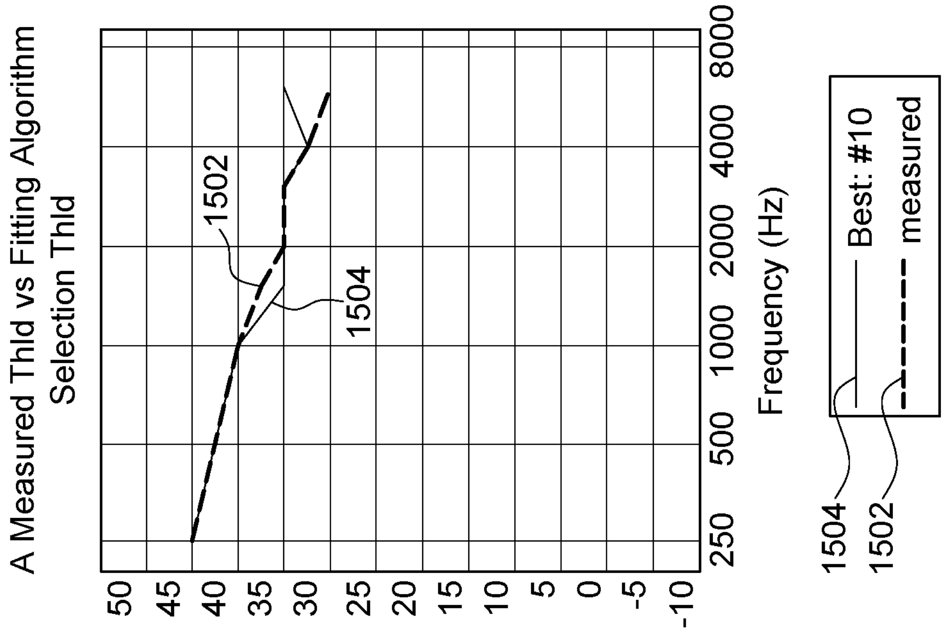
FIG. 15A shows a patient audiogram as measured by hearing assessment procedures according to an embodiment of the present invention.
Figure 15B:
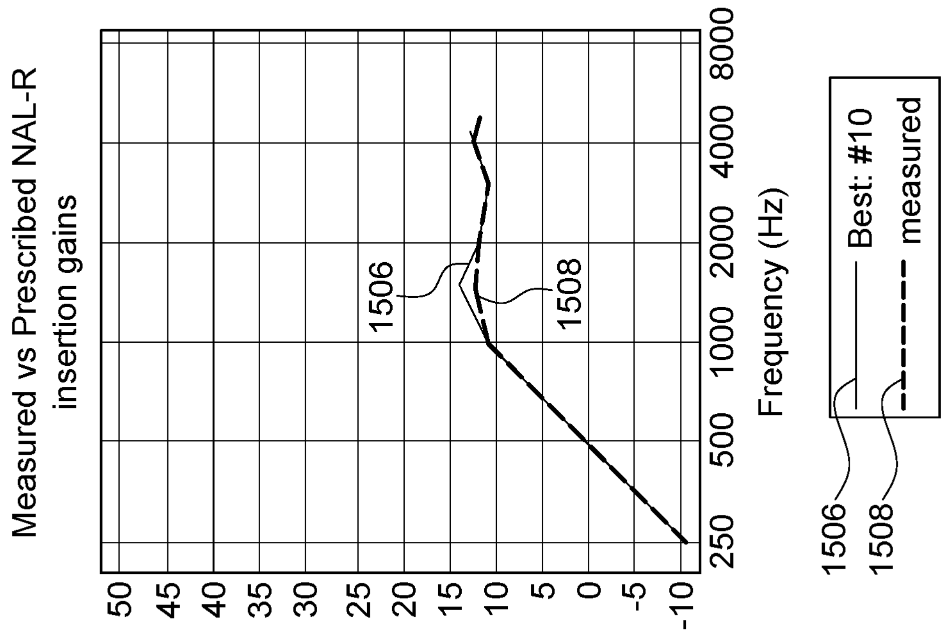
FIG. 15B shows the prescribed NAL-R insertion gain versus what was measured in the coupler and programmed into the hearing aid in the example referred to in FIG. 15A.

FIG. 15A shows an actual patient audiogram 1502 as measured by hearing assessment procedures as described above, according to an embodiment of the present invention. The output of the hearing assessment was inputted to a fitting algorithm to determine the best fit audiogram matching to the hearing thresholds obtained from hearing assessment, according to an embodiment of the present invention. As a result, a corresponding closest fit audiogram 1504 was selected; in this case it was Bisgaard audiogram #10; which corresponds to a mild to moderate hearing loss audiogram. FIG. 15B shows the prescribed NAL-R insertion gain 1506 versus what was measured in the coupler 1508 and programmed into the hearing aid.

References—the following references are incorporated herein, in their entireties, by reference thereto:

[1] Standard Audiograms for the IEC 60118-15 Measurement Procedure Nikolai Bisgaard, Marcel S. M. G. Vlaming, and Martin Dahlquist, 2010, pp. 113-120.

[2] Pascoe DP. (1988) Clinical measurement of the auditory dynamic range and their relation to formulas for hearing aid gain. In Jensen JH (ed). *Hearing Aid Fitting*. Copenhagen: Storgaard Jensen, 129-154

[3] Dillon, *Hearing Aids, Thieme Medical Publishers,* 2005, pp. 240-241.

[4] Lanman, "EN 253: MatLab Exercise #3 Design of a Sound Level Meter", 29 Nov. 2005, pp. 1-10.

[5] ANSI S3.6-2010 American National Standard Specification for Audiometers, pp. 1-68.

While the present invention has been described with reference to the specific embodiments thereof, it should be understood by those skilled in the art that various changes may be made and equivalents may be substituted without departing from the true scope of the invention. In addition, many modifications may be made to adapt a particular situation, material, composition of matter, process, process step or steps, to the objective and scope of the present invention. All such modifications are intended to be within the scope of the claims appended hereto.

That which is claimed:

1. A method of in-situ hearing assessment and customized fitting of a hearing device that can be implemented by a user of the hearing device, said method comprising:

sending instructions to the hearing device to output audio signals having predefined frequencies and loudness levels;

outputting the audio signals to an ear of the user while the hearing device is in an operational position for use by the user;

measuring user hearing threshold levels at predefined frequencies based on feedback provided by the user when listening to the audio signals;

determining whether an unexpected lowered threshold (referred to as a spike) occurs in one or more of the hearing threshold levels at predefined frequencies;

correcting any of the hearing threshold levels at predefined frequencies where a spike has been determined to occur;

finding a best fit audiogram, based on comparisons of the measured and/or corrected user hearing threshold levels with hearing threshold levels from a plurality of audiograms stored in memory; and programming the hearing device with the best fit audiogram;

wherein said finding a best fit audiogram comprises selecting the audiogram determined to have a lowest target score;

wherein target scores are calculated by:

calculating an average hearing threshold level of the determined user hearing threshold levels at predefined frequencies;

calculating an average audiometric slope per octave from the determined user hearing threshold levels at predefined frequencies;

for each of the plurality of audiograms, calculating an absolute hearing level difference between the average hearing threshold level of the determined user hearing I threshold levels and an average hearing threshold level of the audiogram; and calculating an absolute slope difference between the average audiometric slope per octave from the determined user hearing threshold levels and an average audiometric slope per octave from the audiogram;

wherein a target score is calculated to be a sum of the absolute hearing level difference and the absolute slope difference.

2. The method of claim 1, wherein the plurality of audiograms has been pre-calculated using a fitting formula and the memory is a memory of the hearing device.

3. The method of claim 1, further comprising placing the hearing device in a holding device and instructing the holding device to perform said programming.

4. The method of claim 3, wherein said sending instructions and instructing the holding device are performed wirelessly by an app operating on a computing device that is separate from said hearing device and separate from said holding device.

5. The method of claim 3, wherein said sending instructions and instructing the holding device are performed by an app operating on the holding device.

6. The method of claim 3, wherein the holding device comprises a charger, said method further comprising charging the hearing device in the holding device.

7. The method of claim 1, wherein said programming comprises directly programming the hearing device by wireless communication.

8. The method of claim 7, wherein said wireless communication is sent from an app on a computing device to the hearing device.

9. The method of claim 1, wherein said finding a best fit comprises mapping the hearing threshold levels to audiograms in the plurality of audiograms and selecting gain settings of a best fit audiogram from the plurality of audiograms that also has gain settings within constraints imposed by the hearing device.

10. The method of claim 1, comprising performing an environmental noise check prior to said sending instructions to output audio signals, and preventing said sending instructions to output audio signals unless an environmental noise level below a predetermined threshold noise level is detected.

11. The method of claim 1, further comprising:

further determining whether to calculate an estimate of a hearing threshold value at a first of the predefined frequencies based upon a hearing threshold value at a second of the predefined frequencies, wherein the estimate is calculated when the determined user hearing threshold level at the first frequency is greater than the determined user hearing threshold level at the second frequency by more than a predetermined value.

12. The method of claim 1, wherein the hearing device is a first hearing device, said method being repeated for a second hearing device, wherein said first and second hearing devices are for use in left and right ears of the user, respectively; said method further comprising:

determining if there is a significant asymmetry in hearing loss between the left and right ears of the user by comparing the hearing threshold levels at predefined frequencies for the first device to the respective hearing threshold levels at predefined frequencies for the second device; and calculating mean hearing threshold levels at predefined frequencies from the hearing threshold levels at predefined frequencies for the first and second devices when the absolute hearing threshold level difference between the first and second devices, for any measured frequency, does not exceed a predetermined threshold difference;

wherein said finding a best fit audiogram comprises comparing the mean hearing threshold levels with the hearing threshold levels from the plurality of audiograms stored in memory; and wherein both the first and second hearing devices are programmed with the same best fit audiogram.

13. The method of claim 1, wherein the hearing device is a first hearing device, said method being repeated for a second hearing device, wherein said first and second hearing devices are for use in left and right ears of the user, respectively; said method further comprising:

determining if there is a significant asymmetry in hearing loss between the left and right ears of the user by comparing the hearing threshold levels at predefined frequencies for the first device to the respective hearing threshold levels at predefined frequencies for the second device; and when it is determined that there is a significant asymmetry, said finding a best fit audiogram comprises finding best fit audiograms individually for the first and second devices; and the first and second hearing devices are programmed with the individually found best fit audiograms.

14. The method of claim 1, wherein creation of the audiograms stored in memory comprises calculating insertion gains for audiogram hearing threshold levels for the audiograms.

15. The method of any one claim 1, wherein at least one of the audiograms stored in memory have been customized by adjusting at least one of expansion threshold, low level threshold, high level threshold, low level gain, high level gain and/or output limit.

16. A system for in-situ hearing assessment and customized fitting of a hearing device that can be implemented by a user of the hearing device, said system comprising:

a hearing device;

a non-transitory computer-readable storage medium comprising stored computer program instructions executable by at least one processor of the system, the instructions, when executed, causing the processor to send instructions to the hearing device to output audio signals having predefined frequencies and loudness levels;

wherein, upon outputting the signals to an ear of the user while the hearing device is an operational position for use by the user, the stored computer program instructions being further executable by the at least one processor to receive feedback input from the user regarding whether the user hears the output audio signals, and to determine user hearing threshold levels at predefined frequencies based on the feedback input provided by the user when listening for the audio signals;

the stored computer program instructions being further executable by the at least one processor to find a best fit audiogram, based on comparisons of the user hearing threshold levels with hearing threshold levels from a plurality of audiograms stored in memory, and to program the hearing device with the best fit audiogram;

wherein said stored computer program instructions are executable by the at least one processor of the system to:

calculate an average hearing threshold level of the determined user hearing threshold levels at predefined frequencies;

calculate an average audiometric slope per octave from the determined user hearing threshold levels at predefined frequencies;

for each of the plurality of audiograms, calculate an absolute hearing level difference between the average hearing threshold level of the determined user hearing threshold levels and an average hearing threshold level of the audiogram;

calculate an absolute slope difference between the average audiometric slope per octave from the determined user hearing threshold levels and an average audiometric slope per octave from the audiogram; and calculate a target score as a sum of the absolute hearing level difference and the absolute slope difference;

wherein finding said best fit audiogram comprises selecting the audiogram determined to have a lowest target score among the target scores calculated.

17. The system of claim 16, wherein said stored computer program instructions are provided in an app executable on a smartphone, hearing aid charger, laptop computer, or desktop computer.

18. The system of claim 16, further comprising a holding device to which said hearing device can be docked, said holding device being configured to program said hearing device with said best fit audiogram.

19. The system of claim 18, wherein said stored computer program instructions are configured to be executable by said at least one processor of a computing device external to the holding device, and the at least one processor external to the holding device sends instructions to said holding device to program said hearing device with the best fit audiogram.

20. The system of claim 18, wherein said holding device comprises the processor provided with said computer program instructions executable to send said instructions to said hearing device.

21. The system claim 18, wherein said holding device comprises a charger configured to also charge a battery of said hearing device.

22. The system of claim 16, wherein said stored computer program instructions are configured to be executed by the at least one processor to wirelessly send said instructions to the hearing device.

23. The system of claim 18, wherein said stored computer program instructions are configured to be executed by the at least one processor to wirelessly send instructions to said holding device to program said hearing device with said best fit audiogram.

24. The system of claim 22, wherein said stored computer program instructions are configured to be executed by the at least one processor of a smart phone.

25. The system of claim 18, wherein said stored computer instructions are stored in said holding device and are configured to be executed by at least one processor in the holding device.

26. The system of claim 16, wherein finding said best fit comprises mapping the hearing threshold levels to audiograms in the plurality of audiograms and selecting gain settings of a best fit audiogram from the plurality of audiograms that also has gain settings within constraints imposed by the hearing device.

27. The system of claim 16, wherein said stored computer program instructions are executable by the at least one processor of the system to perform an environmental noise check prior to sending said instructions to the hearing device to output audio signals.

28. The system of claim 27, wherein said stored computer program instructions are executable by the at least one processor of the system to prevent sending said instructions to output audio signals unless an environmental noise level below a predetermined threshold noise level is detected.

29. The system of claim 16, wherein said stored computer program instructions are executable by the at least one processor of the system to determine whether to calculate an estimate of a hearing threshold value at a first of the predefined frequencies based upon a hearing threshold value at a second of the predefined frequencies, wherein the estimate is calculated when the determined user hearing threshold level at the first frequency is greater than the determined user hearing threshold level at the second frequency by more than a predetermined value.

30. The system of claim 16, comprising a pair of said hearing devices; first and second hearing devices of said pair of hearing devices being provided for left and right ears of the user, wherein said computer program instructions are executable by the at least one processor to send said instructions to each of said first and second hearing devices, and receive said feedback input from the user regarding each of the first and second hearing devices; and wherein said computer program instructions are further executable by the at least one processor to determine if there is a significant asymmetry in hearing loss between the left and right ears of the user by comparing the hearing threshold levels at predefined frequencies for the first device to the respective hearing threshold levels at predefined frequencies for the second device; and to calculate mean hearing threshold levels at predefined frequencies from the hearing threshold levels at predefined frequencies for the first and second devices when the absolute hearing threshold level difference between the first and second devices, for any measured frequency, does not exceed a predetermined threshold difference;

wherein said best fit audiogram is found by comparing the mean hearing threshold levels with the hearing threshold levels from the plurality of audiograms stored in memory; and wherein both the first and second hearing devices are programmed with the same best fit audiogram.

31. The system of claim 16, comprising a pair of said hearing devices; first and second hearing devices of said pair of hearing devices being provided for left and right ears of the user, wherein said computer program instructions are executable by the at least one processor to send said instructions to each of said first and second hearing devices, and receive said feedback input from the user regarding each of the first and second hearing devices; and wherein said computer program instructions are further executable by the at least one processor at least one processor to determine if there is a significant asymmetry in hearing loss between the left and right ears of the user by comparing the hearing threshold levels at predefined frequencies for the first device to the respective hearing threshold levels at predefined frequencies for the second device; and when it is determined that there is a significant asymmetry, said best fit audiogram comprises a first best fit audiogram found for said first hearing device and a second best fit audiogram found for said second hearing device; and said first and second hearing devices are programmed with the individually found first and second best fit audiograms, respectively.

32. The system of claim 16, wherein said audiograms stored in memory are customized by calculating insertion gains for audiogram hearing threshold levels for the audiograms.

33. The system of claim 16, wherein at least one of the audiograms stored in memory have been customized by adjusting at least one of expansion threshold, low level threshold, high level threshold, low level gain, high level gain and/or output limit.

34. A method of in-situ hearing assessment and customized fitting of a hearing device that can be implemented by a user of the hearing device, said method comprising:

sending instructions to the hearing device to output audio signals having predefined frequencies and loudness levels;

outputting the audio signals to an ear of the user while the hearing device is in an operational position for use by the user;

measuring user hearing threshold levels at predefined frequencies based on feedback provided by the user when listening to the audio signals;

finding a best fit audiogram, based on comparisons of the measured user hearing threshold levels with hearing threshold levels from a plurality of audiograms stored in memory; and programming the hearing device with the best fit audiogram;

wherein said finding a best fit audiogram comprises selecting the audiogram determined to have a lowest target score;

wherein target scores are calculated by:

calculating an average hearing threshold level of the determined user hearing threshold levels at predefined frequencies;

calculating an average audiometric slope per octave from the determined user hearing threshold levels at predefined frequencies;

for each of the plurality of audiograms, calculating an absolute hearing level difference between the average hearing threshold level of the determined user hearing 1 threshold levels and an average hearing threshold level of the audiogram; and calculating an absolute slope difference between the average audiometric slope per octave from the determined user hearing threshold levels and an average audiometric slope per octave from the audiogram;

wherein a target score is calculated to be a sum of the absolute hearing level difference and the absolute slope difference.

* * * * *